US012003535B2

(12) United States Patent
Stokes, III et al.

(10) Patent No.: US 12,003,535 B2
(45) Date of Patent: Jun. 4, 2024

(54) PHISHING URL DETECTION USING TRANSFORMERS

(71) Applicant: MICROSOFT TECHNOLOGY LICENSING, LLC, Redmond, WA (US)

(72) Inventors: Jack Wilson Stokes, III, North Bend, WA (US); Pranav Ravindra Maneriker, Columbus, OH (US); Arunkumar Gururajan, Sammamish, WA (US); Diana Anca Carutasu, Bellevue, WA (US); Edir Vinicio Garcia Lazo, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 493 days.

(21) Appl. No.: 17/246,352

(22) Filed: Apr. 30, 2021

(65) Prior Publication Data
US 2022/0279014 A1    Sep. 1, 2022

Related U.S. Application Data

(60) Provisional application No. 63/155,157, filed on Mar. 1, 2021.

(51) Int. Cl.
*H04L 29/06* (2006.01)
*G06F 40/284* (2020.01)
(Continued)

(52) U.S. Cl.
CPC ........ *H04L 63/1483* (2013.01); *G06F 40/284* (2020.01); *G06N 3/045* (2023.01); *G06N 3/08* (2013.01)

(58) Field of Classification Search
CPC ... H04L 63/1483; G06F 40/284; G06N 3/045; G06N 3/08
See application file for complete search history.

(56) References Cited

U.S. PATENT DOCUMENTS 8,521,667 B2   8/2013  Zhu et al.
11,349,853 B2  5/2022  Sites et al.
(Continued)

FOREIGN PATENT DOCUMENTS

CN   108667816 A   10/2018
EP     3475822 A1    5/2019
(Continued)

OTHER PUBLICATIONS

"Younghoo, Lee", "Joshua Saxe", "Richard Harang", "CATBERT: Context Aware Tiny BERT for Detecting Social Engineering Emails", Oct. 8, 2020 (Year: 2020).*
(Continued)

*Primary Examiner* — Darshan I Dhruv
(74) *Attorney, Agent, or Firm* — Shook, Hardy & Bacon L.L.P.

(57) ABSTRACT

The technology described herein can identify phishing URLs using transformers. The technology tokenizes useful features from the subject URL. The useful features can include the text of the URL and other data associated with the URL, such as certificate data for the subject URL, a referrer URL, an IP address, etc. The technology may build a joint Byte Pair Encoding for the features. The token encoding may be processed through a transformer, resulting in a transformer output. The transformer output, which may be described as a token embedding, may be input to a classifier to determine whether the URL is a phishing URL. Additional or improved URL training data may be generated
(Continued)

by permuting token order, by simulating a homoglyph attack, and by simulating an a compound word attack.

20 Claims, 12 Drawing Sheets

(51) Int. Cl.
    *G06N 3/04*       (2023.01)
    *G06N 3/045*     (2023.01)
    *G06N 3/08*       (2023.01)
    *H04L 9/40*       (2022.01)

(56) References Cited

U.S. PATENT DOCUMENTS

| | | | |
|---|---|---|---|
| 11,360,928 | B2 | 6/2022 | Li et al. |
| 11,399,035 | B1 | 7/2022 | Batchu |
| 11,425,161 | B2 | 8/2022 | Solis Agea et al. |
| 2011/0314546 | A1 | 12/2011 | Aziz et al. |
| 2012/0158626 | A1* | 6/2012 | Zhu .................. G06F 21/56 726/22 |
| 2014/0033307 | A1* | 1/2014 | Schmidtler ......... H04L 63/1483 726/22 |
| 2015/0254566 | A1* | 9/2015 | Chandramouli ....... G06N 20/10 706/11 |
| 2016/0344770 | A1* | 11/2016 | Verma ................ H04L 51/42 |
| 2017/0359368 | A1* | 12/2017 | Hodgman ........... H04L 63/1441 |
| 2018/0077120 | A1 | 3/2018 | Baughman et al. |
| 2018/0097822 | A1 | 4/2018 | Huang et al. |
| 2019/0171934 | A1* | 6/2019 | Sites ................ H04L 63/0227 |
| 2019/0278909 | A1* | 9/2019 | Saxe ................... G06N 3/08 |
| 2019/0349399 | A1* | 11/2019 | Liu .................... H04L 63/1483 |
| 2020/0036750 | A1 | 1/2020 | Bahnsen et al. |
| 2020/0059451 | A1 | 2/2020 | Huang et al. |
| 2020/0067861 | A1* | 2/2020 | Leddy ................ G06F 21/6245 |
| 2020/0104677 | A1 | 4/2020 | Rae et al. |
| 2020/0267119 | A1 | 8/2020 | Huffner et al. |
| 2020/0280583 | A1 | 9/2020 | Zhang et al. |
| 2020/0311519 | A1 | 10/2020 | Fei et al. |
| 2020/0314122 | A1* | 10/2020 | Jones ................ G06N 3/08 |
| 2020/0349430 | A1 | 11/2020 | Schmidtler et al. |
| 2020/0364338 | A1* | 11/2020 | Ducau ................ G06F 21/564 |
| 2020/0366712 | A1* | 11/2020 | Onut .................. G06N 3/084 |
| 2021/0021612 | A1 | 1/2021 | Higbee |
| 2021/0203692 | A1* | 7/2021 | Nunes ................ H04L 63/1483 |
| 2021/0218754 | A1* | 7/2021 | Zou ................... G06N 20/10 |
| 2021/0234892 | A1* | 7/2021 | Narayanaswamy .... H04L 67/02 |
| 2021/0312041 | A1 | 10/2021 | Gururajan et al. |
| 2021/0377303 | A1 | 12/2021 | Bui et al. |
| 2021/0392106 | A1 | 12/2021 | Rajeev et al. |
| 2022/0004642 | A1* | 1/2022 | Pujar .................. G06F 21/577 |
| 2022/0121984 | A1* | 4/2022 | Gupta .................. G06N 20/20 |
| 2022/0129630 | A1* | 4/2022 | Costa .................. G06F 40/30 |
| 2022/0217160 | A1 | 7/2022 | Morgan et al. |
| 2022/0277141 | A1* | 9/2022 | Nijkamp ............. G06F 40/295 |
| 2022/0335278 | A1 | 10/2022 | Wu et al. |
| 2022/0375222 | A1 | 11/2022 | Uhlenbrock et al. |
| 2022/0378305 | A1 | 12/2022 | Peterson et al. |

FOREIGN PATENT DOCUMENTS

| | | | | |
|---|---|---|---|---|
| EP | 3716574 | A1 * | 9/2020 | ............ G06F 16/51 |
| EP | 3716574 | A1 | 9/2020 | |

OTHER PUBLICATIONS

"2019 Internet Crime Report", Retrieved From: https://www.ic3.gov/Media/PDF/AnnualReport/2019_IC3Report.pdf, Feb. 12, 2020, 28 Pages.

"Phishing Attacks at Highest Level in Three Years", Retrieved From: https://www.helpnetsecurity.com/2019/11/07/phishing-attacks-levels-rise/, Nov. 7, 2019, 3 Pages.

"PyTorch: From Research to Production", Retrieved From: http://web.archive.org/web/20201017005110/https://pytorch.org/, Oct. 17, 2020, 3 Pages.

"Making the World's Information Safely Accessible", Retrieved From: http://web.archive.org/web/20201017003718/https://safebrowsing.google.com/, Oct. 17, 2020, 8 Pages.

"The Rise of Single-Use Phishing URLs and the Need for Zero-Second Detection", Retrieved From: https://web.archive.org/web/20200930233011/https://zvelo.com/single-use-phishing-urls-need-zero-second-detection/, Aug. 27, 2019, 7 Pages.

"Transformer (Machine Learning Model)", Retrieved From: https://en.wikipedia.org/wiki/Transformer_(machine_learning_model), Oct. 3, 2021, 7 Pages.

Ba, et al., "Layer Normalization", In Repository of arXiv:1607.06450v1, Jul. 21, 2016, 14 Pages.

Blum, et al., "Lexical Feature based Phishing URL Detection using Online Learning", In Proceedings of the 3rd ACM Workshop on Artificial Intelligence and Security, Oct. 8, 2010, pp. 54-60.

Conneau, et al., "Very Deep Convolutional Networks for Text Classification", In Repository of arXiv:1606.01781v2, Jan. 27, 2017, 10 Pages.

Devlin, et al., "BERT: Pre-training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Goodfellow, et al., "Explaining and Harnessing Adversarial Examples", In Repository of arXiv:1412.6572v1, Dec. 20, 2014, 10 Pages.

He, et al., "Deep Residual Learning for Image Recognition", In Proceedings of the IEEE Conference on Computer Vision and Pattern Recognition, Jun. 27, 2016, pp. 770-778.

He, et al., "Spatial Pyramid Pooling in Deep Convolutional Networks for Visual Recognition", In Journal of IEEE Transactions on Pattern Analysis and Machine Intelligence, vol. 37, Issue 9, Sep. 2015, pp. 1904-1916.

Hendler, et al., "Detecting Malicious PowerShell Scripts Using Contextual Embeddings", In Repository of arXiv:1905.09538v1, May 23, 2019, 17 Pages.

Hu, et al., "Learning Data Manipulation for Augmentation and Weighting", In Proceedings of the 33rd International Conference on Neural Information Processing Systems, Dec. 8, 2019, 12 Pages.

Huang, et al., "Phishing URL Detection via Capsule-Based Neural Network", In Proceedings of 13th International Conference on Anti-counterfeiting, Security, and Identification, Oct. 25, 2019, pp. 22-26.

Joulin, et al., "Bag of Tricks for Efficient Text Classification", In the Proceedings of the 15th Conference of the European Chapter of the Association for Computational Linguistics, Apr. 3, 2017, pp. 427-431.

Kanade, et al., "Learning and Evaluating Contextual Embedding of Source Code", In Proceedings of 37th International Conference on Machine Learning, Jul. 13, 2020, 12 Pages.

Khonji, et al., "Phishing Detection: A Literature Survey", In IEEE Communications Surveys & Tutorials, vol. 15, Issue 4, Apr. 15, 2013, pp. 2091-2121.

Kingma, et al., "Adam: A Method for Stochastic Optimization", In Repository of arXiv:1412.6980v1, Dec. 22, 2014, 9 Pages.

Kobayashi, Sosuke, "Contextual Augmentation: Data Augmentation by Words with Paradigmatic Relations", In Proceedings of the Conference of the North American Chapter of the Association for Computational Linguistics: Human Language Technologies, NAACL-HLT, vol. 2 (Short Papers), Jun. 1, 2018, pp. 452-457.

Le, et al., "URLNet: Learning a URL Representation with Deep Learning for Malicious URL Detection", In Repository of arXiv:1802.03162v1, Feb. 9, 2018, 13 Pages.

Liu, et al., "RoBERTa: A Robustly Optimized BERT Pretraining Approach", In Repository of arXiv:1907.11692v1, Jul. 26, 2019, 13 Pages.

Maneriker, et al., "URLTran: Improving Phishing URL Detection Using Transformers", In Repository of arXiv:2106.05256v1, Jun. 9, 2021, 10 Pages.

(56) References Cited

OTHER PUBLICATIONS

Mikolov, et al., "Distributed Representations of Words and Phrases and their Compositionality", In Proceedings of the 26th International Conference on Neural Information Processing Systems, vol. 2, Dec. 5, 2013, 9 Pages.
Mjcaparas, et al., "Microsoft Defender SmartScreen", Retrieved From: https://web.archive.org/web/20201023063029/https://docs.microsoft.com/en-us/windows/security/threat-protection/microsoft-defender-smartscreen/microsoft-defender-smartscreen-overview, Nov. 27, 2019, 5 Pages.
Oh, et al., "THOMAS: The Hegemonic OSU Morphological Analyzer using Seq2seq", In Proceedings of the 16th Workshop on Computational Research in Phonetics, Phonology, and Morphology, Aug. 2, 2019, pp. 80-86.
Paszke, et al., "Automatic Differentiation in PyTorch", In Proceedings of 31st Conference on Neural Information Processing Systems, Dec. 4, 2017, 4 Pages.
"International Search Report and Written Opinion Issued in PCT Application No. PCT/US2021/026194", dated Jul. 15, 2021, 12 Pages.
Peng, et al., "A Joint Approach to Detect Malicious URL Based on Attention Mechanism", In International Journal of Computational Intelligence and Applications, vol. 18, Issue 3, Jul. 10, 2019, 14 Pages.
Radford, et al., "Language Models are Unsupervised Multitask Learners", In Journal of OpenAI Blog, vol. 1, Issue 8, Feb. 24, 2019, 24 Pages.
Rasymas, et al., "Detection of Phishing URLs by Using Deep Learning Approach and Multiple Features Combinations", In Baltic Journal of Modern Computing, vol. 8, Issue 3, 2020, pp. 471-483.
Rehurek, et al., "Software Framework for Topic Modelling with Large Corpora", In Proceedings of the LREC Workshop on New Challenges for NLP Frameworks, May 2010, pp. 46-50.
Ren, et al., "A Bi-Directional LSTM Model with Attention for Malicious URL Detection", In Proceedings of 4th Advanced Information Technology, Electronic and Automation Control Conference, vol. 1, Dec. 20, 2019, pp. 300-305.
Rogers, et al., "A Primer in BERTology: What we know about how BERT Works", In Repository of arXiv:2002.12327v1, Feb. 27, 2020, 15 Pages.
Sahoo, et al., "Malicious URL Detection using Machine Learning: A Survey", In Repository of arXiv:1701.07179v3, Aug. 21, 2019, 37 Pages.
Schuster, et al., "Japanese and Korean Voice Search", In Proceedings of International Conference on Acoustics, Speech and Signal Processing, Mar. 25, 2012, pp. 5149-5152.
Sennrich, et al., "Neural Machine Translation of Rare Words with Subword Units", In Proceedings of the 54th Annual Meeting of the Association for Computational Linguistics (vol. 1: Long Papers), Aug. 7, 2016, pp. 1715-1725.
Tajaddodianfar, et al., "Texception: A Character/Word-Level Deep Learning Model for Phishing URL Detection", In Proceedings of International Conference on Acoustics, Speech and Signal Processing, May 4, 2020, pp. 2857-2861.
Taylor, Wilson L., ""Cloze Procedure": A New Tool for Measuring Readability", In Journalism Quarterly, vol. 30, Issue 4, Sep. 1953, pp. 415-433.
Tupsamudre, et al., "Everything Is in the Name—A URL Based Approach for Phishing Detection", In Lecture Notes in Computer Science book series (LNCS, vol. 11527), May 19, 2019, pp. 240-248.
Vaswani, et al., "Attention Is All You Need", In Proceedings of 31st Conference on Neural Information Processing Systems, Dec. 4, 2017, 11 Pages.
Wang, et al., "RAT-SQL: Relation-Aware Schema Encoding and Linking for Text-to-SQL Parsers", In Proceedings of the 58th Annual Meeting of the Association for Computational Linguistics, Jul. 5, 2020, pp. 7567-7578.
Wolf, et al., "Transformers: State-of-the-art Natural Language Processing for PyTorch and TensorFlow 2.0", Retrieved From: https://web.archive.org/web/20201016110428/https://github.com/huggingface/transformers, Sep. 30, 2020, 10 Pages.
Wu, et al., "Google's Neural Machine Translation System: Bridging the Gap between Human and Machine Translation", In Repository of arXiv: 1609.08144v1, Sep. 26, 2016, 23 Pages.
Yerima, et al., "High Accuracy Phishing Detection Based on Convolutional Neural Networks", In Proceedings of International Conference on Computer Applications & Information Security, Mar. 19, 2020, 6 Pages.
Yin, et al., "TaBERT: Pretraining for Joint Understanding of Textual and Tabular Data", In Proceedings of the 58th Annual Meeting of the Association for Computational Linguistics, Jul. 5, 2020, pp. 8413-8426.
Zhang, et al., "Character-level Convolutional Networks for Text Classification", In Journal of Advances in Neural Information Processing Systems, Dec. 7, 2015, 9 Pages.
Zhang, et al., "Effective Subword Segmentation for Text Comprehension", In Journal of IEEE/ACM Transactions on Audio, Speech, and Language Processing, vol. 27, Issue 11, Nov. 2019, pp. 1664-1674.
Zhang, et al., "Text Understanding from Scratch", In Repository of arXiv:1502.01710v5, Apr. 4, 2016, 10 Pages.
Bojanowski, et al., "Enriching Word Vectors with Subword Information", In Journal of Transactions of the Association for Computational Linguistics, vol. 5, Jun. 2017, pp. 135-146.
Szegedy, et al., "Going Deeper with Convolutions", In Proceedings of the IEEE Conference on Computer Vision and Pattern Recognition, Jun. 7, 2015, 9 Pages.
Radford, et al., "Improving Language Understanding by Generative Pre-Training", Retrieved From: http://web.archive.org/web/20190311213605/https://s3-us-west-2.amazonaws.com/openai-assets/research-covers/language-unsupervised/language_understanding_paper.pdf, Mar. 11, 2019, 12 Pages.
"Final Office Action Issued in U.S. Appl. No. 16/917,626", dated Nov. 8, 2022, 24 Pages.
"Non Final Office Action Issued in U.S. Appl. No. 16/917,626", dated Jun. 7, 2022, 23 Pages.
Lee, et al., "CATBERT: Context-Aware Tiny BERT for Detecting Social Engineering Emails", In Repository of arXiv:2010.03484v1, Oct. 7, 2020, 11 Pages.
Patel, Krut, "Convolutional Neural Networks—A Beginner's Guide", In Publication of Toward Data Science, Sep. 7, 2019, 13 Pages.
"International Search Report and Written Opinion Issued in PCT Application No. PCT/US2022/017397", dated May 16, 2022, 17 Pages.
"Notice of Allowance Issued in U.S. Appl. No. 16/917,626", dated May 10, 2023, 9 Pages.

\* cited by examiner (a) Area under ROC vs hyperparameters (b) TPR@FPR = 0.01% vs hyperparmeters

PHISHING URL DETECTION USING TRANSFORMERS

CROSS-REFERENCE TO RELATED APPLICATIONS

This application claims the benefit of U.S. Provisional Application No. 63/155,157, filed Mar. 1, 2021, the entirety of which is hereby incorporated by reference.

BACKGROUND

Electronic content, such as webpages and emails, are widely used communication tools that provide a quick and inexpensive method of communication between individuals and groups. Increasingly, spam emails and webpages, phishing emails and webpages, and emails that include or link to malicious programs (e.g., malware, ransomware) pose risks to users, companies, and computing devices. In the past, efforts have been made to identify unwanted and/or malicious content before the content is received by a user using a filtering system. The filtering system may use natural language processing or other mechanisms to classify an email or webpage accordingly to a variety of characteristics. Many of these characteristics are constantly changing. Making crude filters that use a "black list" of malicious characteristics miss large amounts of newly added malicious content. For example, it is easy to create and start using a new Uniform Resource Locator (URL) that would not be on any lists. At present, no filtering system is perfect. Some benign content is misclassified as malicious, while other malicious content reaches users. Further, real-time filters used during browsing can add a significant latency to a browsing experience.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein can identify phishing URLs using transformers. The technology can work with a web browser, email system, or any other program interacting with URLs. Initially, the technology receives an unknown URL. The technology tokenizes useful URL features. The useful features can include the text of the URL and other data associated with the URL, such as certificate data for the URL, a referrer URL, an IP address, etc. In one aspect, the technology may build a joint Byte Pair Encoding (BPE) for the tokens. This allows the text of the URL and the data associated with the URL to be jointly analyzed in a single machine learning process from a single input.

The token encoding may be processed through an L-Layer Transformer, resulting in a transformer output. The transformer output, which may be described as a token embedding, may be input to a classifier to determine whether the URL is a phishing URL. A warning may be output when the URL is determined to be malicious. In addition to a warning, the system may take action to prevent a device from accessing a resource associated with the URL.

The classifier may be a single fully connected layer that operates on the transformer output to produce a decision input vector. A decision statistic is formed from the decision input vector and weights which have been learned from a training process.

In some embodiments, additional or improved URL training data may be generated by permuting token order, by simulating a homoglyph attack, and by simulating an a compound word attack.

BRIEF DESCRIPTION OF THE DRAWINGS

The technology described herein is illustrated by way of example and not limitation in the accompanying figures in which like reference numerals indicate similar elements and in which.

DESCRIPTION

Figure 1:
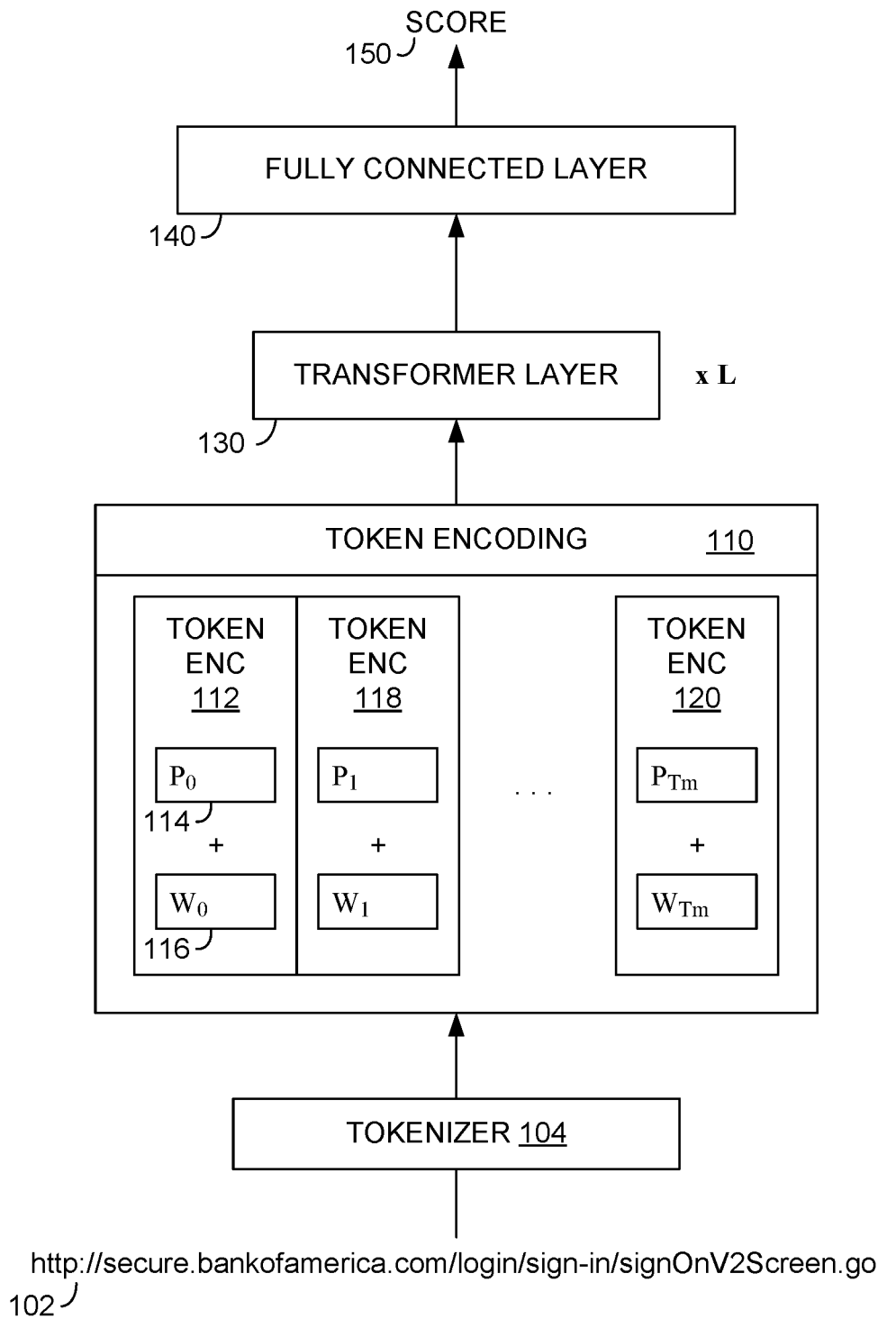
FIG. 1 is a block diagram of the high-level process flow and system used to classify URLs, in accordance with an aspect of the technology described herein.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein identifies malicious URLs using a classifier that is both accurate and fast. Aspects of the technology are particularly well adapted for use as a real-time URL security analysis tool because the technology is able to quickly process a URL and produce a warning or other automated response when a malicious URL is identified. A real-time URL security analysis evaluation can be used on the client or server side for multiple applications including during a user's browser session, to evaluate links in emails as they are received, evaluate social media posts containing URLs as they are published, and the like.

Browsers often include security features to detect phishing web pages. In the past, some browsers evaluated an unknown URL for inclusion in a list of known phishing pages. However, as the number of URLs and known phishing pages continued to increase at a rapid pace, browsers started to include one or more machine learning classifiers as part of their security services that aim to better protect end users from harm. While additional information may be used, browsers typically evaluate every unknown URL using some classifier to detect these phishing pages in real time. Early phishing detection used standard machine learning classifiers, but recent research has instead proposed the use of deep learning models for the phishing URL detection task.

The technology described herein uses transformer models on the phishing URL detection task. The technology can use fine-tuned BERT and RoBERTa models. The novel technology described herein may be described as URLTran, which uses transformers to significantly improve the performance of phishing URL detection over a wide range of very low false positive rates (FPRs) compared to other deep learning-based methods. For example, URLTran yields a true positive rate (TPR) of 86.80% compared to 71.20% for the next best baseline at an FPR of 0.01%, resulting in a relative improvement of over 21.9%. Further, the model can be improved by adversarial black-box phishing attacks, such as those based on homoglyphs and compound word splits to improve the robustness of URLTran. Fine-tuning under these adversarial samples demonstrate that URLTran can maintain low FPRs under these scenarios.

Phishing occurs when a malicious web page is created to mimic the legitimate login page used to access a popular online service whose purpose is to input credit card or other payment information. Typical phishing targets include online banking services, web-based email portals, and social media web sites. Attackers use several different methods to direct the victim to the phishing site in order to launch the attack. In some cases, they may send the user a phishing email containing the URL of a phishing page. Attackers may also use search engine optimization techniques to rank phishing pages high in a search result query. Modern email platforms and browsers use various machine-learning models to detect phishing web page attacks. The technology described herein is a new deep learning model that analyzes URLs and is based on transformers, which have shown state-of-the-art performance in many important natural language processing tasks.

In order to prevent users from inadvertently uploading personal information to the attackers, web browsers provide additional security services to identify and block or warn a user from visiting a known phishing page. For example, Google's Chrome browser utilizes their Safe Browsing technology and Microsoft's Edge browser includes Windows Defender SmartScreen. In a related attack which is also addressed by these services, malicious URLs may point to a web page hosted by a misconfigured or unpatched server with the goal of exploiting browser vulnerabilities in order to infect the user's computer with malware (i.e., malicious software).

Successful phishing web page detection includes a number of significant challenges. First, there is a huge class imbalance associated with this problem. The number of phishing pages on the internet is very small compared to the total number of web pages available to users. Second, phishing campaigns are often short-lived. In order to avoid detection, attackers may move the login page from one site to another multiple times per day. Third, phishing attacks continue to be a persistent problem. The number of known phishing sites continues to increase over time. Therefore, blocking phishing attacks only using a continuously growing list of known phishing sites often fails to protect users in practice.

Popular web browsers may render hundreds of millions or even billions of web pages each day. In order to be effective, any phishing or malicious web page detection must be fast. For this reason, several researchers have proposed detecting both phishing and malicious web pages based solely on analyzing the URL itself.

Given the significant repercussions of visiting a phishing or malicious web page, the detection of these URLs has been an active area of research. In some cases, researchers have proposed the use of classic natural language processing methods to detect malicious URLs.

Semi-supervised machine learning methods have been used to create text embeddings that offer state-of-the-art results in many natural language processing tasks. The technology described herein improves the methods by the inclusion of a transformer model, among other improvements. Bidirectional Encoder Representations from Transformers ("BERT") utilizes transformers to offer significant improvements in several Natural Language Processing ("NLP") tasks. Generative Pre-trained Transformer ("GPT") and GPT-2 have also followed a similar approach. The semantics and syntax of natural language are more complex than URLs, which must follow a strict syntax specification.

The technology can be implemented, at least, two different ways. First, an existing transformer architecture is pre-trained and fine-tuned using only URL data. In the first approach, the commonly used Cloze-style masked language-modeling objective is extended with a permutation-based dynamic data augmentation strategy.

Second, publicly available pre-trained transformer models are fine-tuned. In the second approach, BERT and RoBERTa are fine-tuned on the URL classification task.

Finally, the model performance can be improved by adding simulated training data. For example, two common black-box phishing attacks may be simulated by perturbing URLs in our data using Unicode-based homoglyph substitutions and inserting '-' characters between sub-words in a compound URL (e.g., 'bankofamerica.com'→>'bank-of-america.com').

Results on a large corpus of phishing and benign URLs show that transformers are able to significantly outperform recent state-of-the-art phishing URL detection models (URLNet, Texception) over a wide range of low false positive rates where such a phishing URL detector must operate. The technology described herein is described as URLTran. At a false positive rate of 0.01%, URLTran increases the true positive rate from 71.20% for the next best baseline (URLNet) to 86.80% (21.9% relative increase). Thus, browser safety services, such GOOGLE's Safe Browsing and MICROSOFT's SmartScreen, may potentially benefit using the proposed URLTran system for the detection of phishing web pages.

Five aspects are discussed herein. First, the use of transformers to improve the detection of phishing URLs. Second, the simulated results produced by URLTran, a large-scale system with production data and labels and demonstrate that transformers do offer a significant performance improvement compared to previous recent deep learning solutions over a wide range of very low false positive rates. Third, the impact of various design choices in terms of hyperparameters are analyzed, pre-training tasks, and tokenizers to contribute to an improved model. Fourth, the false positives, false negatives, and adversarially generated URLs from the system are analyzed to understand the limitations of URL-Tran. Fifth, model performance is improved by appending URL metadata to the URL tokenization for processing with a transformer model.

Phishing URL Data

The data sets used for training, validation and testing the technology described herein may take from production browsing telemetry data. The schema for all three data sets (training, validation and testing) is similar and may consist of the browsing URL and a Boolean determination of whether the URL has been identified as phishing or benign.

Due to the highly unbalanced nature of the data sets (for example, roughly 1 in 50 thousand URLs is a phishing URL), down-sampling of the benign set may be used. In one embodiment, the down sampling resulted in a ratio of 1:20 (phishing versus benign) for both the training and validation sets. In one aspect, a test run with the technology described herein had 1,039,413 records for training and 259,854 thousand for validation. The test set used for evaluating the models consists of 1,784,155 records, of which 8,742 are phishing URLs and the remaining 1,775,413 are benign.

The labels included in this study correspond to those used to train production classifiers. Phishing URLs may be manually confirmed by analysts including URLs that have been reported as suspicious by end-user feedback. Other URLs are also labeled as phishing when they are included in known phishing URL lists.

Benign URLs are those which correspond to web pages which are known to not be involved with a phishing attack. In this case, these sites may have been manually verified by analysts using manual analysis. In other cases, benign URLs can be confirmed by thorough (i.e., production grade) off-line automated analysis which may not be an option for real-time detection required by the browser. None of the benign URLs were included in known phishing lists or have been reported as phishing pages by users and later verified by analysts. Although these last two criteria are not sufficient to add an unknown URL to the benign list. It is important to note that all URLs labeled as benign correspond to web pages that have been validated. They are not simply a collection of unknown URLs (i.e., ones that have not been previously detected as phishing sites).

Methodology

The technology described herein, ("URLTran") seeks to use recent advances in natural language processing to improve the task of detecting phishing URLs. Building URLTran employs a two-pronged approach towards adapting transformers for the task of phishing URL detection. First, state-of-the-art transformer models—BERT and RoBERTa are fine-tuned, starting from publicly available vocabularies and weights and across different hyperparameter settings, resulting in URLTran_BERT and URLTran_RoBERTa respectively. Second, domain-specific vocabularies are built using different tokenization approaches, and a domain specific transformer (URLTran_CustVoc) is first pre-trained and then fine-tuned on the task. The threat model for URLTran allows the attacker to create any phishing URL, including URLs that employ domain squatting techniques. In its current form, URLTran is protected against homoglyph and compound word attacks through dataset augmentation. In one aspect, domain squatting attacks can also be simulated and included in the augmented adversarial training, validation, and test sets. In addition, a larger number of adversarial training examples can be directed at more popular domains, such as https://www.bankofamerica.com, that may be a target of attackers.

The general architecture of an exemplary model takes a three-stage approach for classifying a URL, as shown in FIG. 1. The model first uses a sub-word tokenizer 104 to extract tokens from a URL 102. Next, a token encoder 110 builds a plurality of token encodings (112, 118, and 120). The token encodings may include a word token 116 and a position 114. Then a transformer model 130 generates an embedding vector for the unknown URL. Finally, a classifier 140 predicts a score 150 indicating whether the unknown URL corresponds to a phishing web page. In the following sections, we first briefly summarize the transformer model architecture, followed by the training tasks used to train the model, and end with a description of the adversarial settings under which URLTran is evaluated and then trained with adversarial examples to improve its robustness.

Architecture

The tokenization schemes and overall architecture for classification are described in this section, skipping a detailed description of transformer models for brevity.

The raw input to the URLTran model is the URL, which can be viewed as a text sequence. The first step in the phishing URL detection task involves converting this input URL into a numerical vector that can be further processed by a classic machine learning or deep learning model.

Previous URL detection models extracted lexical features by first splitting the URL with a set of important delimiters (e.g., '=', '/', '?', '.', ' ') and then creating a sparse binary based on these tokens. Recent deep-learning based URL detection models instead include separate word-level and character-level CNNs where the character-level CNNs span different lengths of character subsequences.

Instead of these approaches, the technology described herein uses multiple sub-word tokenization schemes. Sub-word models have seen increased adoption in different tasks in NLP, including machine translation, word analogy, and question answering. While using full-length words reduces the input representation length (number of tokens) allowing more input to be processed by a fixed-length model, using a sub-word model can provide morphological insights to improve inference. For example, a full-length model would consider 'bankofamerica' and 'bankofcanada' as completely unrelated tokens, whereas a sub-word model can recognize the shared sub-word 'bank' to correlate URLs belonging to the two banks. Important character subsequences, including prefixes and suffixes can also provide relevant information while being more robust to polymorphic attacks.

In particular, for URLTran_BERT and URLTran_RoBERTa, the technology described herein uses the existing word piece and Byte Pair Encoding (BPE) models, respectively. In addition to these, custom character-level and byte-level BPE vocabularies are created using the training URL data to have a domain specific vocabulary for URLTran_CustVoc with two different vocabulary sizes, 1 K and 10 K. The BPE models attempt to find a balance of using both character subsequences and full words.

The BPE models first break the $m^{th}$ URL, $u_m$, into a sequence of text tokens, $TOK_m$, where the individual tokens may represent entire words or sub-words. The token sequence is formed as:

$TOK_m = Tokenizer(u_m)$ where $TOK_m$ is of length Tin positions and consists of individual tokens $Tok_t$ at each position index t. For example, the BERT word-piece token sequence generated from the URL of a popular banking login page, $$u_m = \text{secure.bankofamerica.com/login/sign-in/signOnV2Screen.go}$$

is shown in Table 1. The word-piece model includes special text tokens specified by (##) which build upon the previous token in the sequence. In the example in Table 1, '##of' means that it occurs after a previous token ('bank'), and it is distinguished from the more common, separate token 'of'.

TABLE 1

Example of the Wordpiece token sequence extraction from a popular banking web page.

| | |
|---|---|
| URL($u_m$) | Secure.bankofamerica.com/login/sign-in/signOnV2Screen.go |
| Token Sequence ($TOK_m$) | { 'secure', '.', 'bank', '##of', '##ame', '##rica', '.', 'com', '/', 'log', '##in', '/', 'sign', '-', 'in', '/', 'sign', '##on', '##v', '##2', '##screen', '.', 'go' } |

The final embedding produced by the transformer model can be used for a variety of downstream NLP tasks such as language understanding, language inference, and question and answering, and training classifiers. We use the transformer embeddings of the URL for two tasks: pre-training masked language models, and fine-tuning for classification of phishing URLs. Both of these tasks require a final classification layer, which can be applied to multiple tokens for masked token prediction, and a pooled representation for classification. The transformer models that we train use a single, dense two-class classification layer, which is applied to a special pooled token ('[CLS]') for classification. A dense layer having vocab_size classes is used for predicting the masked token for the masked language modeling task during pre-training.

$$s_m = W x_m + b$$

W and b are the weight matrix and bias vector, respectively, for the final dense linear layer. $s_m$ is the score which predicts if the URL $u_m$ corresponds to a phishing web page when performing classification, and is the sequence of masked token probability score vectors when performing masked language modeling for input token $x_m$.

Training

The Masked Language Modeling (MLM) task is used to perform pre-training for transformers. In this task, a random subset of tokens is replaced by a special '[MASK]' token. The training objective for the task is the cross-entropy loss corresponding to predicting the correct tokens at masked positions.

The intuition for using this task for URLs is that specific query parameters and paths are generally associated with non-phishing URLs and therefore predicting masked tokens would help to uncover these associations. Similar intuitions derived from the doze task motivate the usage of MLMs for pre-training natural language models. Following the MLM hyperparameter settings for BERT, 15% of the tokens were uniformly selected for masking, of which 80% are replaced, 10% were left unchanged, and 10% were replaced by a random vocabulary token at each iteration. Dynamic masking was used, i.e., different tokens masked from the same sequence across iterations. The training subset of the full dataset was used for pre-training to prevent any data leakage.

For URLTran_BERT and URLTran_RoBERTa, all of the initial parameters derived using a large, internal natural language corpus generated by their respective authors, were used. For URLTran_CustVoc, following the completion of the MLM pre-training step, the learned weights were used as initialization values.

Next, URLTran's model parameters are further improved using a second "fine-tuning" training process that depends upon the error signal from the URL classification task and gradients based on gradient descent using the Adam optimizer with the cross-entropy loss.

Adversarial Attacks and Data Augmentation

Phishing URL attacks can occur on short-lived domains and URLs that have small differences from existing, legitimate domains. We simulate two attack scenarios by constructing examples of such adversaries based on modifying benign URLs. Note that these generated domains do not actually exist in the pre-existing training and testing data, but are based upon frequently observed phishing attack patterns. We also utilize a reordering-based dynamic augmentation, which is used as an additional pre-training objective for URLTran_CustVoc and also used for generating adversarial attacks.

We generate domains that appear nearly identical to legitimate URLs by substituting characters with other Unicode characters that are similar in appearance. This attack strategy is commonly referred to as a homoglyph attack, and we implement this strategy using the python library homoglyphs. In particular, given a URL, we first extract the domain. For a randomly selected character in the domain, we check for one Unicode (utf-8) Latin or Cyrillic character that is a homoglyph for it. We only perturb one character to minimize the probability that such a URL would we be identified as phishing by the user. We then replace the character by its homoglyph to construct a new URL. The URLs generated from this strategy are labeled as phishing.

An alternative way to construct new phishing URLs is by splitting domains into sub-words (restricted to English) and then concatenating the sub-words with an intermediate hyphen. For example, 'bankofamerica.com'→'bank-ofamerica.com'. To implement this, we leverage the enchant dictionary. Consider a URL with domain d having |d|=n characters. Let $\mathcal{D}$ denote the English dictionary. Let C(d, i, j) denote the function that returns True if d [i . . . j] can be split into one or more parts, each of which is a word in the dictionary $\mathcal{D}$. The compound word problem can be formulated recursively as $$C(d, i, j) = \begin{cases} \text{True}, d[i \ldots j] \in \mathcal{D} \\ \text{True } \exists k, C(d, i, k) \text{ and } C(d, k+1, j) \\ \text{False otherwise} \end{cases}$$

Using this recursive definition, we implement a dynamic programming algorithm that can compute whether a domain can be split and the corresponding splits. These splits are then concatenated with hyphens between the discovered words. Note that the base case check d [i . . . j]∈D is performed in a case insensitive manner.

Figure 2:
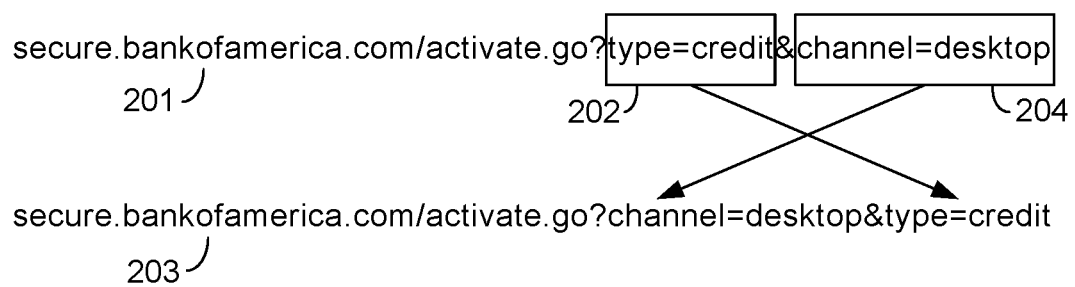
FIG. 2 is a diagram depicting an example URL permutation used to analyze training data, in accordance with an aspect of the technology described herein.

Data augmentation using invariants, contextual replacement, and reward-based learning has been used to improve classifiers in the text domain. These can be extended to augment data in the URL domain. To improve the accuracy of URLTran_CustVoc, the query parameters of a URL were permuted to generate a new URL dynamically. As the query parameters of a URL are interpreted as a key-value dictionary, this augmentation incorporates permutation invariance. An example of a URL and permutation is provided in FIG. 2. In FIG. 2, the first URL 201 is used to create the permuted URL 203 by swapping the location of string 202 with string 204. This approach is used to generate adversarial examples. Since reordering the parameters still result in a valid URL, parameter reordering does not represent a phishing attack, and therefore we do not modify a URL's label.

The approach the technology described herein uses for generating data for an adversarial attack includes generating separate augmented training, validation and test datasets based on their original dataset. For each URL processed in these datasets, the technology described herein may generate a random number. If it is less than 0.5, the technology described herein augments the URL, or otherwise, the URL is included in its original form. For URLs that are to be augmented, the technology described herein may modify it using either a homoglyph attack, a compound attack or parameter reordering with equal probability. If a URL has been augmented, the technology described herein also includes the original URL in the augmented dataset.

Numerical Evaluation

In this section, the numerical evaluation of the different approaches presented in the previous sections is provided. We then compare URLTran to several recently proposed baselines. We also report the top false positive and false negative errors. Finally, we analyze the robustness of the model to generated phishing URLs.

Setup

The hyperparameter settings for all models are provided in Tables 3-8. In our experiments, we set the hyperparameters for previously published models according to their settings in the original paper. For evaluating URLTran_CustVoc, we vary the number of layers between {3, 6, 12}, number of tokens between {128, 256}, use both a byte-level and character-level BPE tokenizer, with 1 K- and 10 K-sized vocabularies. We randomly pick 15 hyperparameter combinations among these settings and present the results for these. The Adam optimizer is used in both pre-training and fine tuning, with the triangular scheduler used for fine-tuning. Adam is a replacement optimization algorithm for stochastic gradient descent for training deep learning models. Adam provides an optimization algorithm that can handle sparse gradients on noisy problems. The hyperparameter settings for URLNet are given in Table 3, while Table 4 indicates the hyperparameter settings for the Texception baseline model. The hyperparameter settings for the proposed URLTran_BERT model, which were chosen by hyperparameter search, are provided in Table 5.

TABLE 3

Hyperparameter settings used for the URLNet model.

| Parameter | Value |
| --- | --- |
| max_len_words | 200 |
| max_len_chars | 1000 |

TABLE 3-continued

Hyperparameter settings used for the URLNet model.

| Parameter | Value |
| --- | --- |
| max_len_subwords | 20 |
| min_word_freq | 1 |
| dev_pct | 0.001 |
| delimit_mode | 1 |
| emb_dim | 32 |
| filter_sizes | [3, 4, 5, 6] |
| default_emb_mode | char + wordCNN |
| nb_epochs | 5 |
| train_batch_size | 128 |
| train_l2_reg_lambda | 0.0 |
| train_lr | 0.001 |

TABLE 4

Hyperparamater seetings used for Texception base-line model.

| | Parameter | Value |
| --- | --- | --- |
| Characters Branch | embedding dimension | 32 |
| | number of blocks | 1 |
| | block filters | [2, 3, 4, 5] |
| | Adaptive MaxPool output | 32, 32 |
| | maximum characters | 1000 |
| Words Branch | embedding dimension | 32 |
| | number of blocks | 1 |
| | block filters | [1, 3, 5] |
| | Adaptive MaxPool output | 32, 16 |
| | maximum words | 50 |
| FastText Model | minimum words to include | 50 |
| | vocabulary size | 120000 |
| | window size | 7 |
| | n-grams | 2-6 |
| | embedding dimension | 32 |
| | epochs trained | 30 |

TABLE 5

Hyperparameter settings used for training the proposed Huggingface-based URLTRan_BERT model.

| Parameter | Value |
| --- | --- |
| attention probs dropout probs | 0.1 |
| hidden act | gelu |
| hidden dropout prob | 0.1 |
| hidden size | 768 |
| initializer range | 0.02 |
| intermediate size | 3072 |
| layer norm eps | 1e−12 |
| max position embeddings | 512 |
| num attention heads | 12 |
| num hidden layers | 12 |
| type vocab size | 2 |
| vocab size | 30522 |
| bert model | Bert-base-uncased |
| max seq length | 128 |
| train batch size | 32 |
| learning rate | 2e−5 |
| num train epochs | 10 |

All training and inference experiments were conducted using PyTorch version 1.2 with NVIDIA Cuda 10.0 and Python 3.6. The experiments were conducted by extending the Hugging Face and Fairseq PyTorch implementations found on GitHub. The large class imbalance makes accuracy a poor metric of model performance. We evaluated all the models using the true positive rate (TPR) at low false positive rate (FPR) thresholds. We used the receiver operating characteristics (ROC) curve to compute this metric.

TABLE 6

Hyperparamater settings used for fine-tuning the proposed Fairseq-based URLTRan_RoBERTa model.

| Parameter | Value |
| --- | --- |
| Number of Layers | 12 |
| Hidden size | 768 |
| FFN inner hidden size | 3072 |
| Attention heads | 12 |
| Attention head size | 64 |
| Dropout | 0.1 |
| Attention Dropout | 0.1 |
| Warmup Steps | 508 |
| Peak Learning Rate | 1e−4 |
| Batch Size | 2k |
| Max Epochs | 10 |
| Learning Rate Decay | Linear |
| Adam $\in$ | 1e−6 |
| Adam $\beta_1$ | 0.9 |
| Adam $\beta_2$ | 0.98 |
| Gradient Clipping | 0.0 |
| Token per sample | 256 |

TABLE 7

Hyperparamater settings used for pre-training the proposed URLTRan_CustVoc model.

| Parameter | Value |
| --- | --- |
| Number of Layers | 3 |
| Hidden size | 768 |
| FFN inner hidden size | 3072 |
| Attention heads | 12 |
| Attention head size | 64 |
| Dropout | 0.14 |
| Attention Dropout | 0.1 |
| Tokens per sample | 128 |
| Peak Learning Rate | 1e−4 |
| Batch size | 2k |
| Toenizer Type | Byte BPE |
| Weight Decay | 0.01 |
| Max Epochs | 30 |
| Learning Rate Decay | reduce on plateau |
| LR Shrink | 0.5 |
| Adam $\in$ | 1e−6 |
| Adam $\beta_1$ | 0.9 |
| Adam $\beta_2$ | 0.98 |
| Gradient Clipping | 0.0 |
| Learning Rate | 1e−4 |
| vocab size | 10000 |

TABLE 8

Hyperparameter settings used for fine-tuning the proposed Fairseq-based URLTRan_CustVoc model.

| Parameter | Value |
| --- | --- |
| Learning Rate | 1e−4 |
| Batch Size | 2k |
| Max Epochs | 10 |
| Learning Rate Decay | Linear |
| Warmup ratio | 0.06 |

Baselines

To evaluate the performance of our models, we compare it to two baseline URL detection models: URLNet and Texception. URLNet is a CNN-based model that was recently proposed for the task of detecting malicious URLs. In our baseline, we have completely trained and tested the URLNet model for the detection of phishing URLs. Texception is another deep learning URL detection model that has been proposed for the task of identifying phishing URLs.

URLTran_CustVoc

Figure 3:
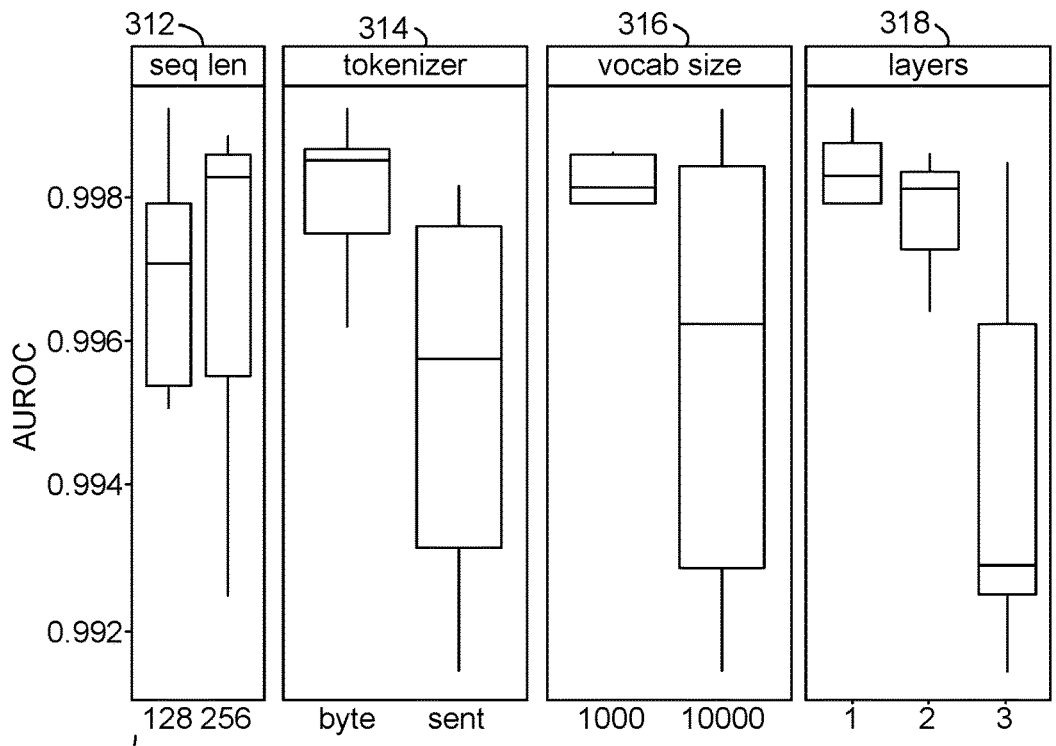
FIG. 3 shows an AUROC curve vs hyper parameters used in different model simulations, in accordance with an aspect of the technology described herein.
Figure 3:
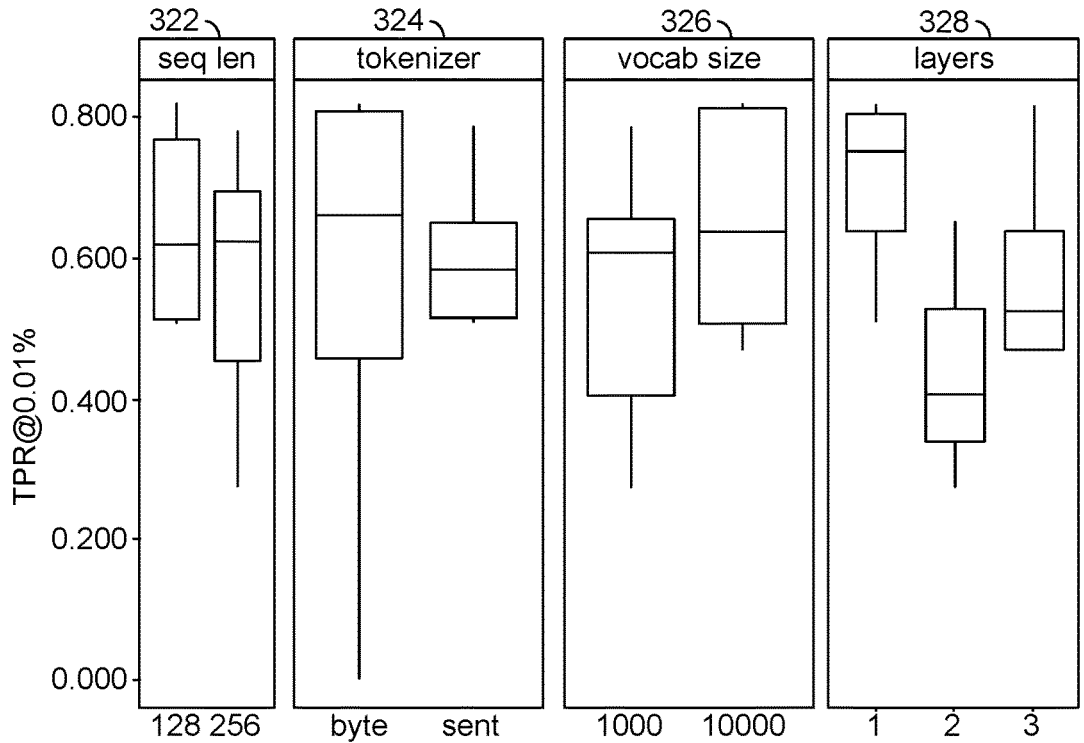

Transformers typically require large amounts of pre-training data (e.g., BERT used a corpus of ≈3.3 B tokens). However, this data is derived from text articles, which are structured differently from URLs. The difference in dataset size and data domain make it important to understand the impact of different hyperparameters used when training transformers from scratch. In FIG. 3, shows the result of runs across different hyperparameters are compared on the area under a receiver operating characteristic curve, or ROC curve (AUROC) 310 and TPR@0.01% FPR 320. The ROC curve is created by plotting the true positive rate (TPR) against the false positive rate (FPR) at various threshold settings. FIG. 3 demonstrates that the training is not very sensitive to sequence length (312 and 322). Smaller byte level vocabularies (314, 316, 324, and 326) tend to be better overall, but at low FPR (326), the difference is not significant. Finally, we found that the 3-layer model generalized the best (318 and 328). We hypothesize that the better performance of the model with fewer layers is because of limited pre-training data and epochs.

Model Performance

Figure 4:
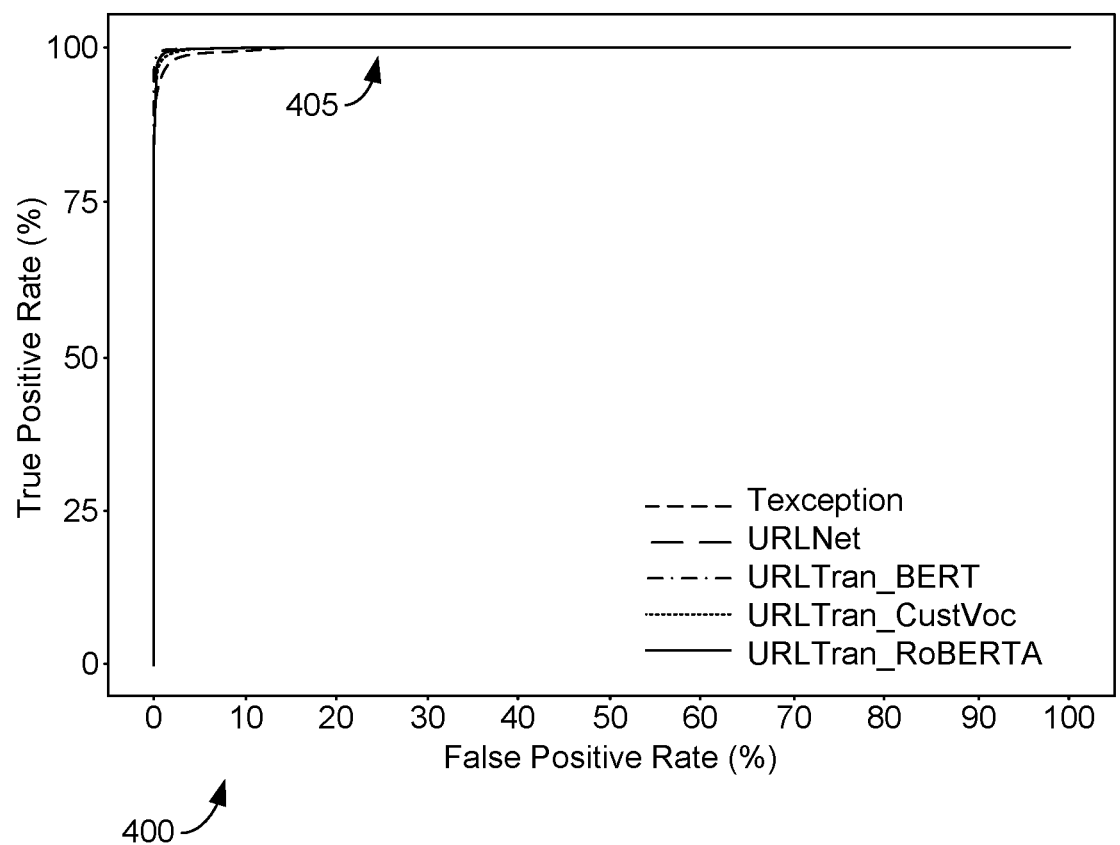
FIGS. 4-6 are show the result of performance simulations of the technology described herein verse other models used to classify URLs, in accordance with an aspect of the technology described herein.

We next analyze the performance of the best parameters of all the proposed transformer variants. FIG. 4 shows the ROC performance curves 405 for URLTran variations, and the URLNet and Texception baselines on the hold out test set over the full range of false positive rates (FPRs).

Figure 5:
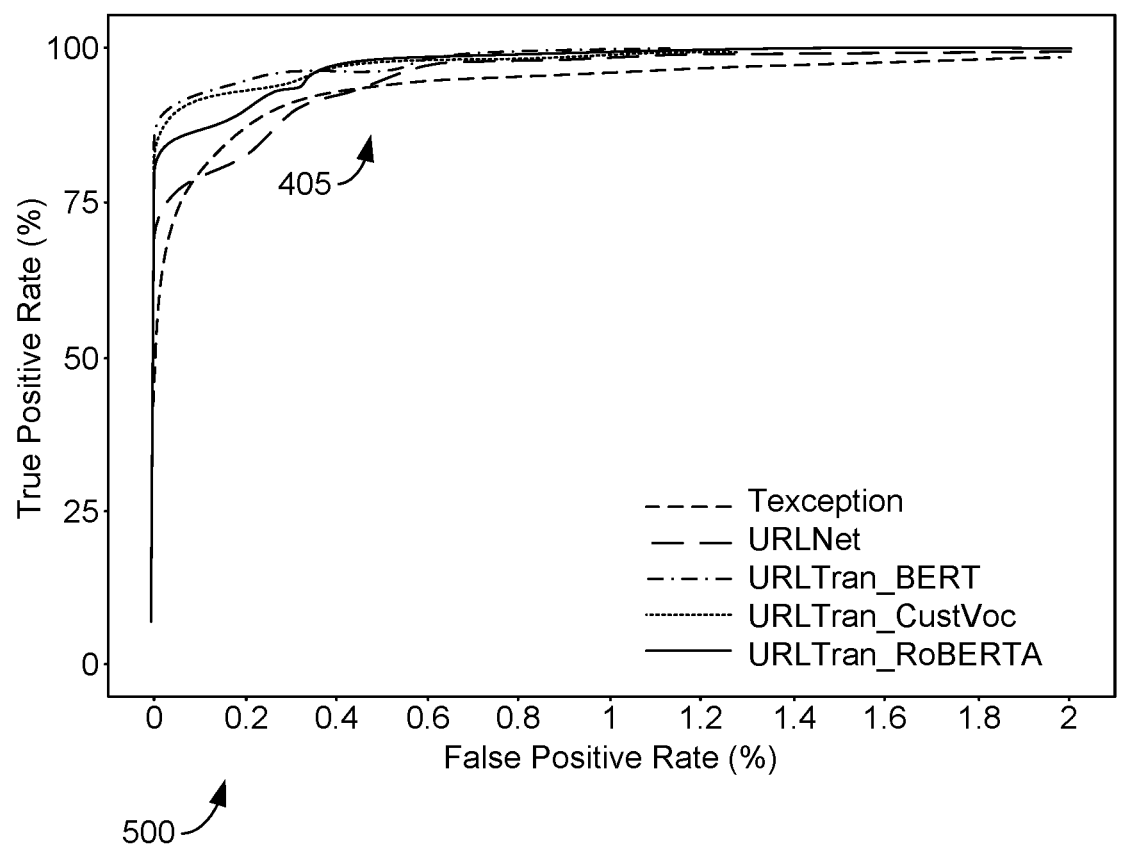
Figure 6:
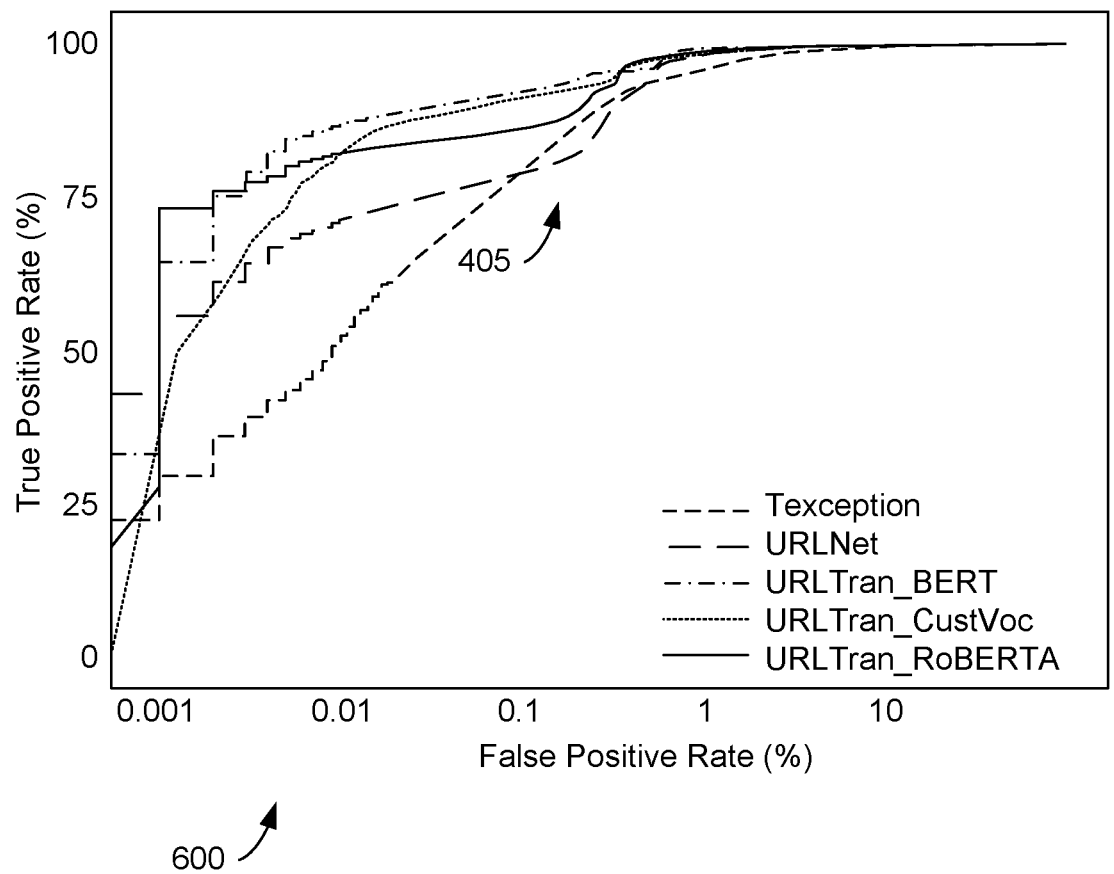

To better understand how these models compare at very low FPRs where detection thresholds must be set to operate in a production environment, the ROC curves 405 are plotted 500 on a linear x-axis zoomed into a 2% maximum FPR in FIG. 5. We also re-plot these ROC curves 405 on a log x-axis in the semilog plot 600 in FIG. 6. These results indicate that all variants of URLTran offer a significantly better true positive rate over a wide range of extremely low FPRs. In particular, URLTran matches or exceeds the TPR of URLNet for the FPR range of 0.001%-0.75%. The result is very important because phishing URL detection models must operate at very low FPRs (e.g., 0.01%) in order to minimize the number of times the security service predicts that a benign URL is a phishing site (i.e., a false positive). In practice, the browser manufacturer selects the desired FPR and tries to develop new models that can increase the TPR for the selected FPR value.

In addition to the ROC curve analysis, we also summarize a number of key performance metrics in Table 2. In the table, 'F1' is the F1 score, and 'AUC' is the area under the model's ROC curve. The proposed URLTran model outperforms both Texception and URLNet for all of these metrics. In particular, we note that at an FPR of 0.01%, URLTran_BERT has a TPR of 86.80% compared to 71.20% for URLNet and 52.15% for Texception.

TABLE 2

Comparison of different performance metrics
for URLTran and the two baseline models

| Model | Accuracy (%) | Precision (%) | Recall (%) | TPR@FPR = 0.01% | F1 | AUC |
|---|---|---|---|---|---|---|
| Texception | 99.6594 | 99.7562 | 99.6594 | 52.1505 | 0.9969 | 0.9977 |
| URLNet | 99.4512 | 99.7157 | 99.4512 | 71.1965 | 0.9954 | 0.9988 |
| URLTran_CustVOC | 99.5983 | 99.7615 | 99.5983 | 81.8577 | 0.9965 | 0.9992 |
| URLTran_RoBERTa | 99.6384 | 99.7688 | 99.6384 | 82.0636 | 0.9968 | 0.9992 |
| URLTran_BERT | 99.6721 | 99.7845 | 99.6721 | 86.7994 | 0.9971 | 0.9993 |

Adversarial Evaluation

To understand URLTran's robustness to adversarial attacks, we first compare the low FPR regions of the ROC curve of the unprotected model tested with the original test set to the test set which includes adversarial samples (AdvAttack) generated through the methods described previously. There is a significant drop in performance of URLTran_BERT when attacked with adversarial URLs. Next, we consider the scenario where attack strategies are incorporated into the training data (AdvTraining). On the addition of adversarial attack patterns to the training, the model is able to adapt to novel attacks, and even outperform the unprotected version of URLTran. These results demonstrate that URLTran can adapt to novel attacks. Further, as new attack strategies are recognized (e.g., homoglyph), a robust version of URLTran can be trained to recognize similar patterns in unseen test data.

The technology described herein is a transformer-based system called URLTran whose goal is to predict the label of an unknown URL as either a phishing or a benign web page. Transformers have demonstrated state-of-the-art performance in many natural language processing tasks, and this paper seeks to understand if these methods can also work well in the cybersecurity domain. In this work, we demonstrate that transformers, which may be fine-tuned using the standard BERT tasks, also work remarkably well for the task of predicting phishing URLs. Instead of extracting lexical features or using CNNs kernels, which span multiple characters and words and are both in previously proposed URL detection models, our system uses the BPE tokenizers for this task. Next, transformers convert the token sequence to an embedding vector, which can then be used as input to a standard, dense linear layer. Results indicate that URLTran is able to significantly outperform recent baselines, particularly over a wide range of very low false positive rates.

URL Analysis with Metadata

Often applications (e.g., email client, browser) that encounter a URL will also have access to metadata associated with the URL. The metadata can form a strong phishing signal. The metadata can include a certificate context, which is associated with the subject URL. Certificate context can include any certificate information such as a signature algorithm, issuer, etc.

A screening application can process URL and URL metadata together. The screening application forms a feature token string from one or more of subject URL, source context data and destination context data. A feature token string is processed through a classifier. In some instances, the classifier is a machine learning classifier. The classifier receives the feature token string and determines a threat level. In some instances, the threat level is an integer between 0 and 9. In some instances, the threat level is a continuous variable. The screening application determines from the threat level that the subject URL is malicious if the threat level exceeds a detection threshold. In some instances, the classifier determines whether the subject URL is a Phishing URL. In some instances when the subject URL is determined to be malicious, the application is notified, and an alert is presented to the user that the subject URL is malicious. In some instances, the screening application blocks access to the subject URL.

In some instances, a feature token string is comprised of a plurality of subsequent token strings separated by a separator token. In some instances, the feature token string comprises a token string for the subject URL, a token string for source context data, a token string for referring URL, a token string for destination context data, a token string for certificate context, and a token string for IP address.

Multi-feature Malicious URL Classification

Figure 7:
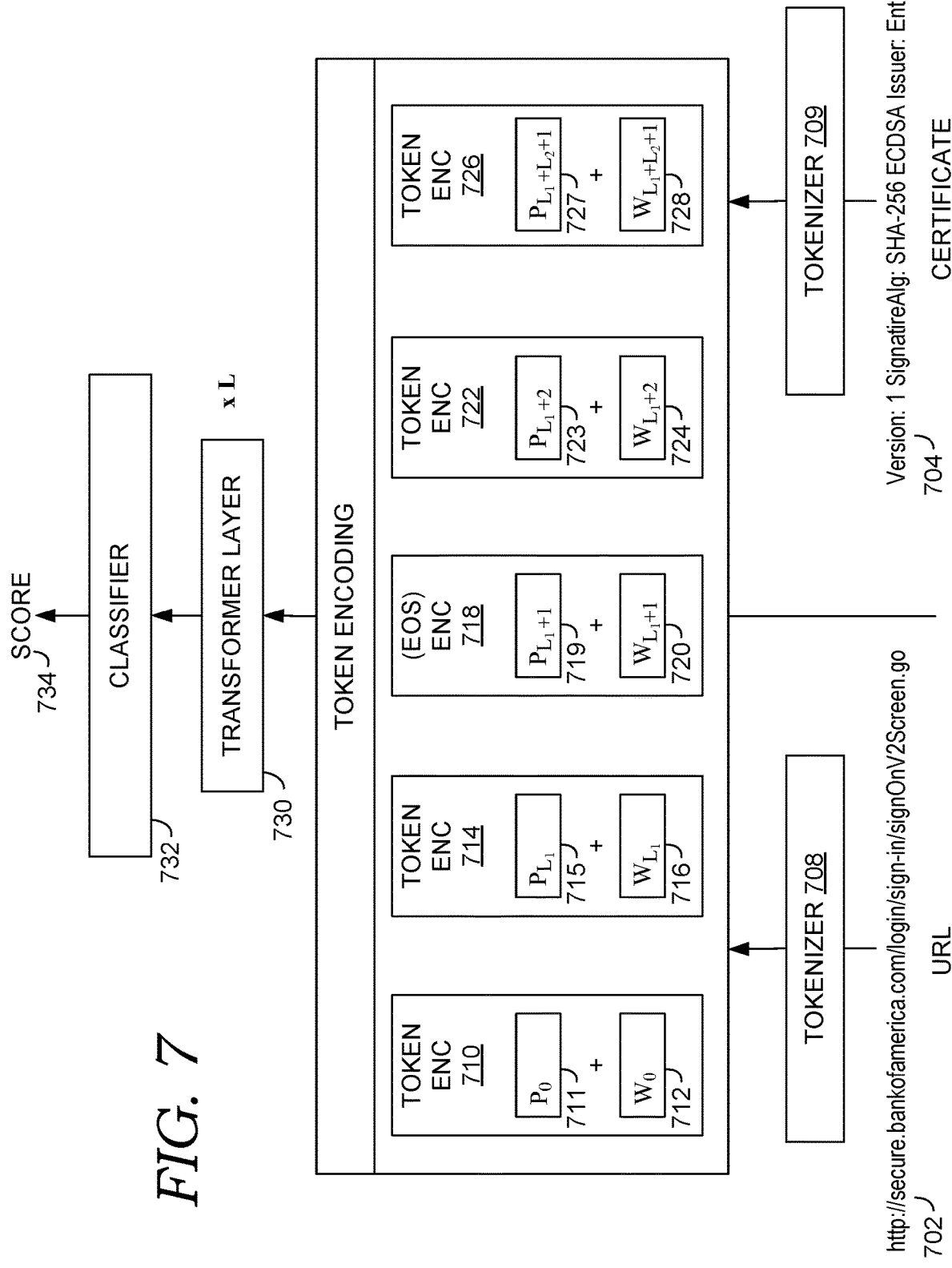
FIG. 7 shows a high level process flow for processing URLs and URL metadata with transformers, in accordance with an aspect of the technology described herein.

The general architecture of an exemplary model for classifying a URL using the URL and metadata is shown in FIG. 7. The model first uses a sub-word tokenizer 708 to extract tokens from a URL 702. The model also uses a second tokenizer 709 to extract tokens from URL metadata. In this example, the URL metadata is the certificate 704 issued by a security authority. Only a single type of metadata is described in this example for the sake of illustration, in implementations multiple different types of metadata may be tokenized and encoded. Next, a token encoder 705 builds a plurality of token encodings (710, 714, 718, 722, and 726). The token encodings may include word tokens 712, 716, 720, 724, and 728 and corresponding positions 711, 715, 719, 723, and 727. Then a transformer model 730 generates an embedding vector for the unknown URL. Finally, a classifier 732 predicts a score 734 indicating whether the unknown URL corresponds to a phishing web page. The score 734 may be described as a decision statistic. The classifier 732 may be a single fully connected layer.

Tokenization: First, we build a joint Byte Pair Encoding (BPE) for the combined data from all useful features, i.e., this tokenizer generates the tokens corresponding to each feature used. Byte pair encoding is a form of data compression in which the most common pair of consecutive bytes of data may be replaced with a byte that does not occur within that data. A table of the replacements may be used to rebuild the original data. This is analogous to the idea of building a joint tokenizer for multiple languages for machine translation, where each column is analogous to one 'language'. Examples of the features include the subject URL, the referrer URL, certificate data for the URL, IP address, etc. Finally, we extend this tokenizer with a special token, "[EOS]", denoting the separator between features.

For instance, consider one instantiation of this model that uses the URL, referrer URL (RURL), and certificate (cert). The tokenizer TOK will generate tokens corresponding to the URL $(TOK_{URL}=[TOK_{UL}^1, TOK_{URL}^2, \ldots, TOK_{URL}^{L1}])$, the referrer URL $(TOK_{RURL}=[TOK_{RURL}^1, TOK_{RURL}^2, \ldots, TOK_{RURL}^{L2}])$, the certificate $(TOK_{cert}=[TOK_{cert}^1, TOK_{cert}^2, \ldots, TOK_{cert}^{L3}])$.

$L_1$, $L_2$, $L_3$ are the number of tokens corresponding to each feature post padding and truncation. We concatenate the tokens into a single input vector with "[EOS]" tokens between them and truncate/pad to a final length L to get a final token vector:

$[TOK_{URL}^1, \ldots, TOK_{URL}^{L1}, EOS, TOK_{RURL}^1, \ldots, TOK_{RURL}^{L2}, EOS, TOK_{cert}^1, \ldots, TOK_{cert}^{L3}]$ Model: In some instances we use a machine learning BERT-style transformer architecture, such as discussed herein. A BERT-style architecture generally produces a context-dependent embedding vector for a word-piece while making use of multiple transformer layers as discussed herein. A BERT-style architecture generally uses bidirectional unsupervised language representation for pre-training. A BERT-style architecture produces a context-dependent embedding vector, rather than a fixed embedding vector produced by a context independent method such as word2vec. The same word piece such as "bank" will have the same embedding vector under word2vec whether the sentence that contains the word "bank" is drawn from bankofamerica.com, or from bankontruth.com. However, a BERT-style transformer architecture results in an embedding vector assignment that differentiates the noun "bank" in bankofamerica from the verb "bank" in bankontruth.com.

Training:

Masked Language Modelling: The pretraining task is motivated by the masked URL task used for a single field. In this case, a subset of tokens is selected with uniform probability for masking and replaced with a "[MASK]" token. The model is trained to predict the masked tokens. The objective of this task is beyond learning the structure of a single field. In this step, we expected the model to learn correlations between different features. For instance, which cert tokens (e.g., certifying authority) are commonly associated with a URL, what referrers are typically expected for a specific URL, etc.

Fine-tuning: The fine-tuning task is the phishing URL classification task, where the gradients are back propagated using the cross-entropy loss.

A transformer model is generally a deep learning model that employs a number of sequential layers with each layer relating adjacent tokens to one another through an attention mechanism. An attention unit forms a scaled dot product from the tokens. The result is that the embedding produced for a token are developed in the context of the other tokens in the token string. A weighted combination of relevant tokens determines the embedding vector through a set of attention weights. Typically, a transformer model learns three matrices: a matrix of query weights a matrix of key weights and a matrix of value weights. A word-piece embedding vector is multiplied by each weight matrix to produce respectively a query vector, key vector and value vector. Attention weights are from token i to token j are produced by the dot product between the query vector i and the key vector j. The Attention weights are typically normalized by the square root of the dimension and passed through a softmax function, thus normalizing the weights to sum to 1. The output value of an attention unit is then the weighted sum of the value vectors of all tokens weighted by the values of the attention matrix.

Transformer Model: After tokenization, a set of embedded tokens are then passed through multiple transformer layers 730. The output of the transformer layers 730 may be processed by a fully connected layer (e.g., classifier 732) to generate a score 734. The score 734 may be alternatively described as a decision statistic herein.

The term transformer refers to language models consisting of a stack of transformer layers with multiple attention heads, along with skip connections and layer normalization, for example, as described with reference to FIG. 8. The training of such a model is split into two portions—a pre-training stage followed by a fine-tuning stage.

Figure 8:
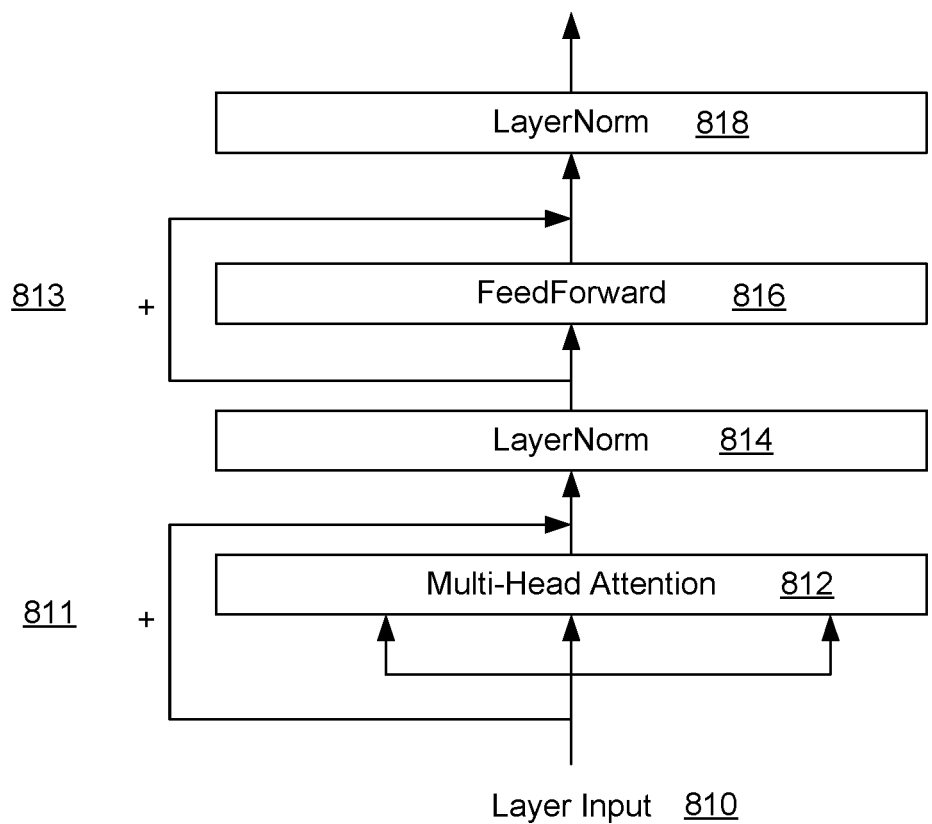
FIG. 8 shows a high-level process flow and system used to classify URLs using both URL text and URL metadata, in accordance with an aspect of the technology described herein.

As shown in FIG. 8, each transformer layer consists of two parts—an attention layer 812 and a feed forward layer 816. The attention sub-layer 812 consists of scaled-dot products to determine a weight for the encoding corresponding to each token. This weight is derived from the dot-product between a component of a token's encoding 810 with that of other tokens. Different formulations use weights derived from attention on different sets of tokens. In some examples, a model uses tokens that occur at positions in the sequence prior to the current token. In some examples, the model uses all tokens. Several such attention layers run in parallel, leading to multiple attention 'heads' 812. The output of the attention sub-layer 812 may be normalized in first normalization layer 814. The second sub-layer is a fully connected feed forward layer 816. Each sublayer also has skip connections (811 and 813) with the output of the previous layer. Finally, a second normalization layer 818 normalizes the output of the transformer layer.

In some examples, such as BERT, base model have a stack of 12 such transformer layers. The output vectors from these layers are then used for training the transformer model on multiple tasks.

Figure 9:
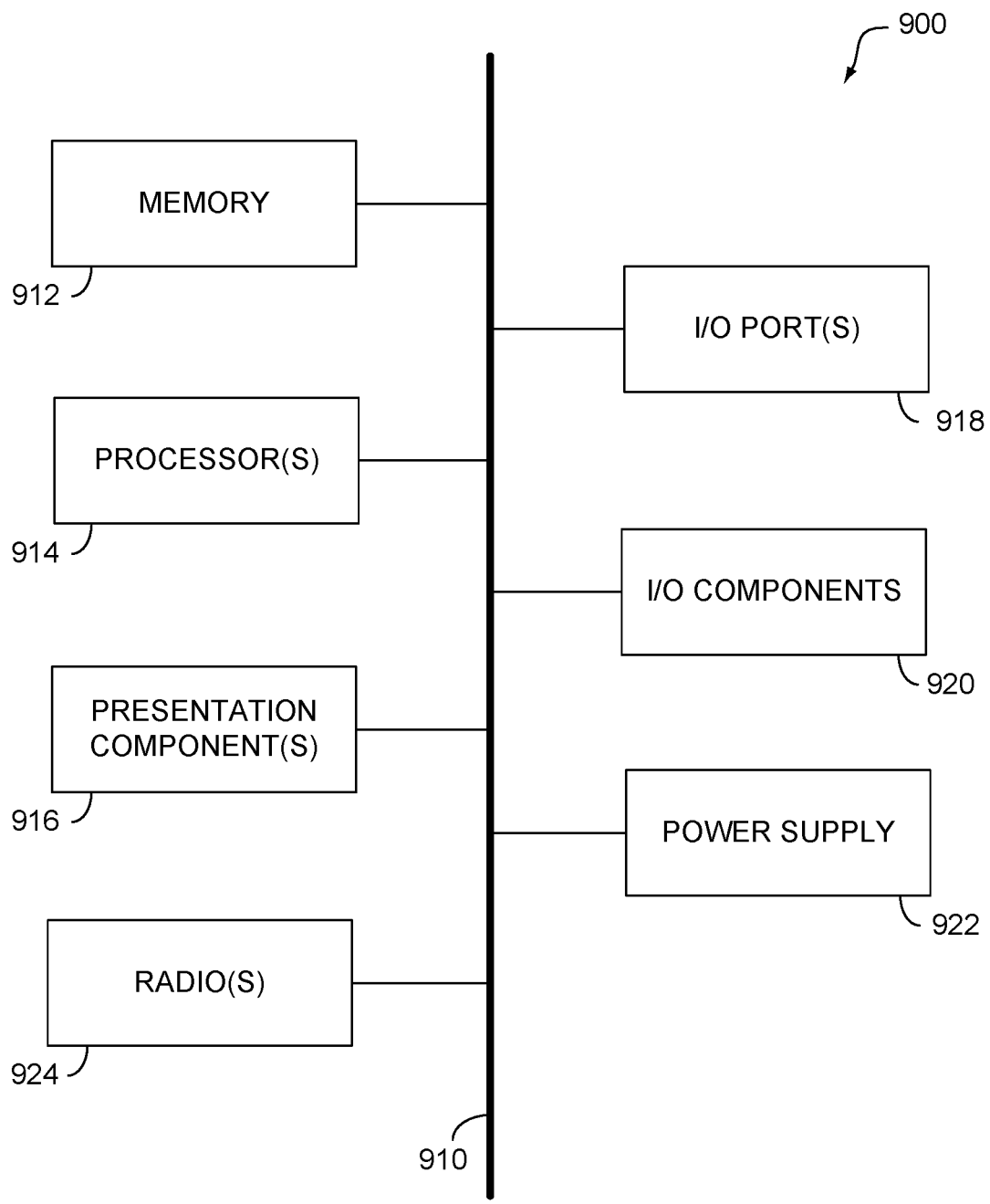
FIG. 9 is a block diagram of an exemplary computing environment suitable for use in implementing aspects of the technology described herein.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the present technology. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc.

The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some aspects of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Figure 10:
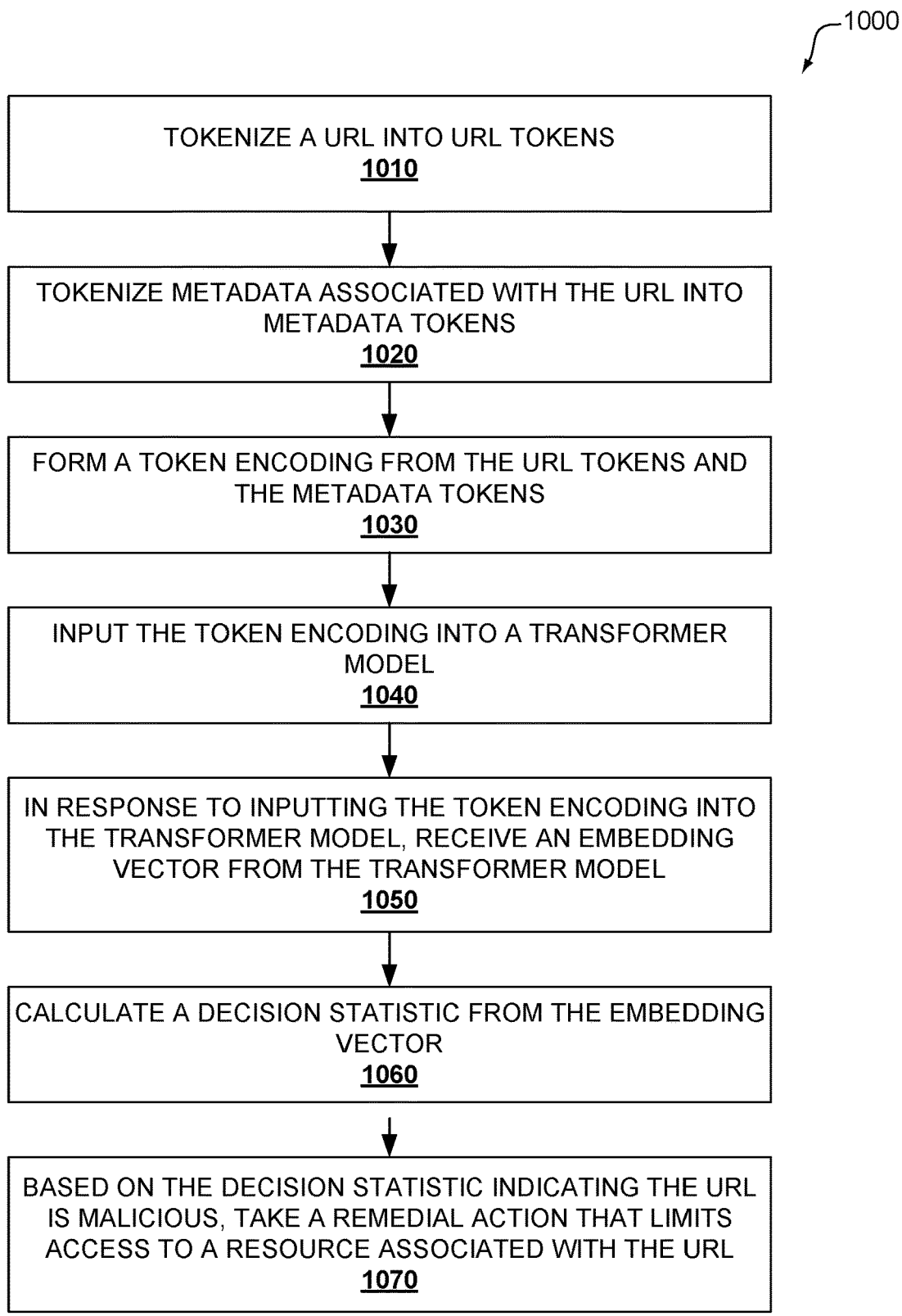
FIGS. 10-12 are flow diagrams showing additional exemplary methods of identifying malicious URLs, in accordance with an aspect of the technology described herein.
Figure 11:
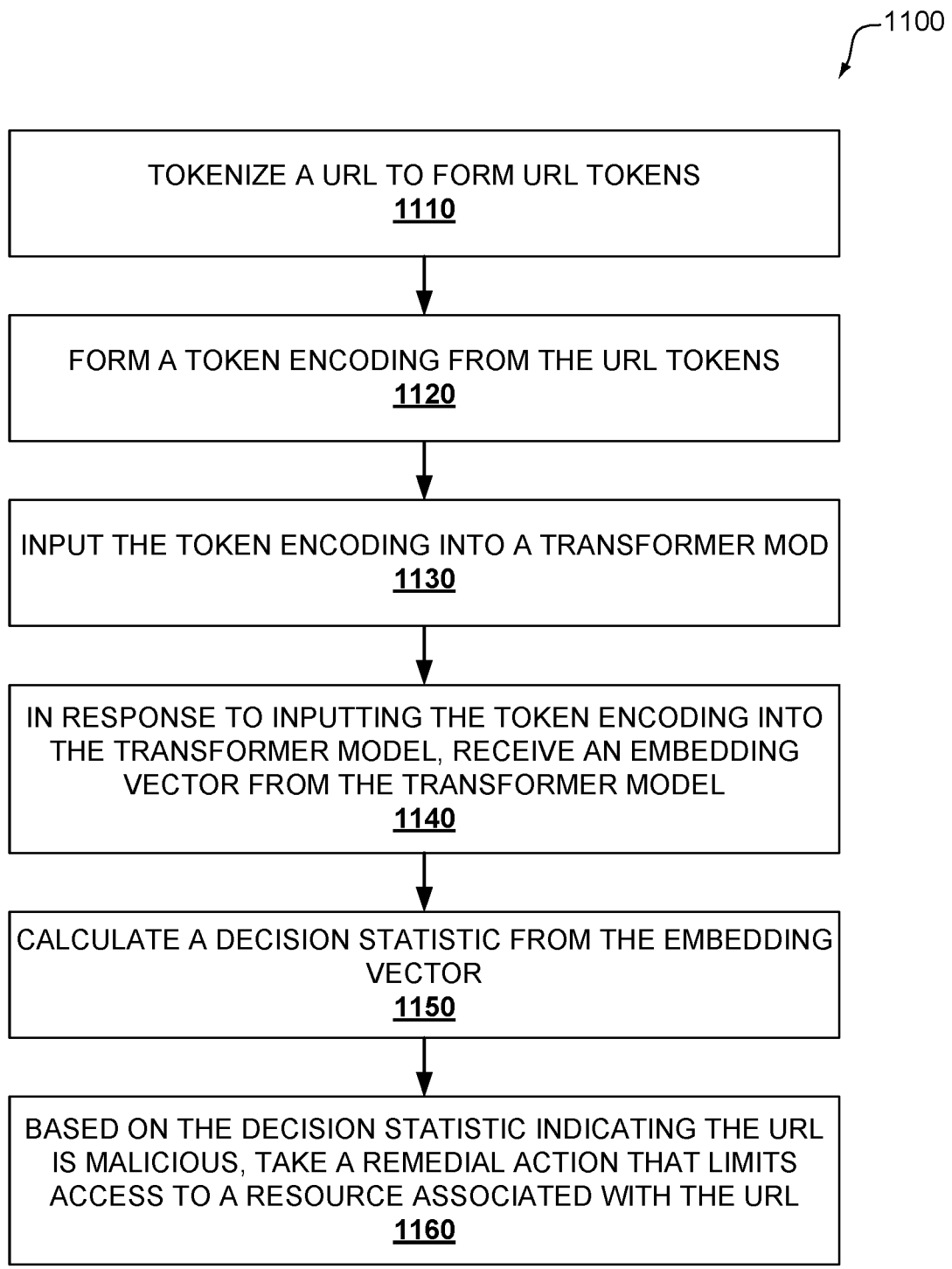
Figure 12:
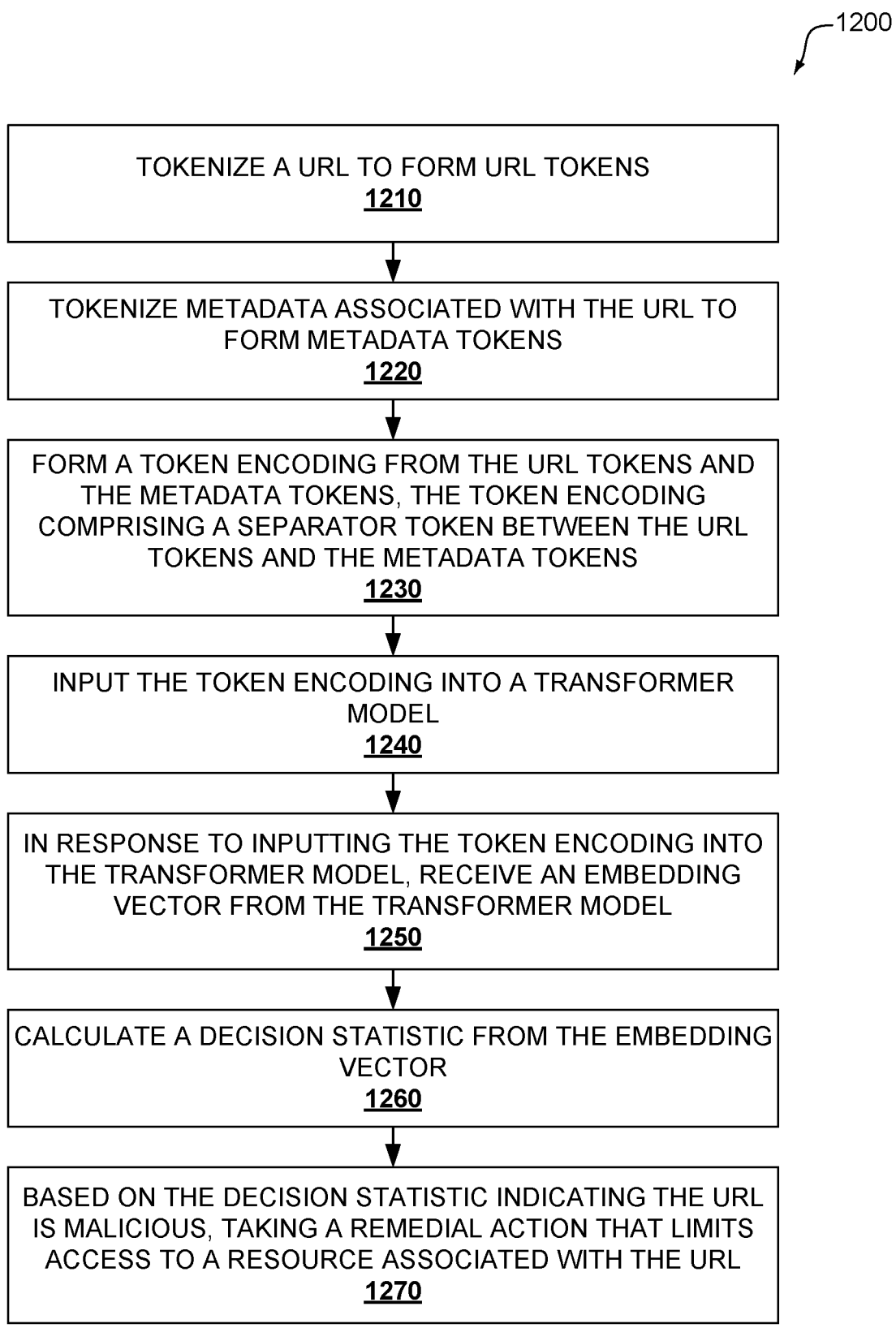

Now referring to FIGS. 10-12, each block of methods 1000, 1100, and 1200, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 1000, 1100, and 1200 are described, by way of example, with respect to the systems of FIG. 1 and additional features of FIGS. 7 and 8. However, these methods may additionally or alternatively be executed by any one system, or any combination of systems, including, but not limited to, those described herein.

FIG. 10 is a flow diagram showing a method 1000 for detecting a malicious uniform resource locator (URL), in accordance with some embodiments of the present disclosure.

The method 1000, at block 1010 includes tokenizing a URL to form URL tokens. A token is an instance of a sequence of characters in the URL that are grouped together as a useful semantic unit for processing. The token can comprise a sequence of characters from the URL forming a word, sub-word, or character. The token can comprise additional symbols not found in the URL, such as ##, that add semantic meaning to the token.

Tokenizing the URL is a process of generating tokens from the text of the URL. In one aspect, sub-word tokenization methods are used to tokenize the URL. In other aspects, word-based or character-based tokenization is used. In order to perform sub-word tokenization, a sub-word vocabulary may be built. The vocabulary may be used to identify tokens in the URL text. A sub-word vocabulary may be built by analyzing a corpus of words, such as URLs. Words or word parts that occur frequently will be added to the vocabulary. The sub-words do not need to be whole words. For example, the word "unfortunately" could be made by combining sub-words "un", "for", "tun", "ate" and, "ly". In which case, "un", "for", "tun", "ate" and, "ly" would all become sub-word tokens in a vocabulary. In practice, common words may be added to the sub-word vocabulary as whole words while less common words are broken into constituent parts. The number of words in the training data can have an impact on this process. The larger the vocabulary size the more common words can be tokenized.

In one aspect, a Byte Pair Encoding (BPE) model is used for tokenization. For BPE, the frequency of words is used to determine which tokens are merged to create a token set. BPE ensures that the most common words will be represented in the new vocabulary as a single token, while less common words will be broken down into two or more sub-word tokens. To achieve this, BPE goes through every potential option at each step and picks the tokens to merge based on the highest frequency. In one aspect, a BPE tokenization model trained on edited text, such as Wikipedia, is used. This model would not be trained on URLs, in one aspect.

In one aspect, the existing WordPiece model used in BERT is used for tokenization. WordPiece may be considered an intermediary between the BPE approach and a unigram approach. WordPiece is similar to BPE and uses frequency of occurrence to identify potential merges, but makes the final decision based on the likelihood of the merged token. The existing WordPiece model is trained on a corpus of edited text. In an aspect, the WordPiece model is not trained on URL data.

In one aspect, custom character-level and byte-level BPE vocabularies are created using the training URL data to have a domain specific vocabulary with two different vocabulary sizes, 1 K and 10 K.

The BPE models first break the $M^{th}$ URL, $u_m$, into a sequence of text tokens, $TOK_m$, where the individual tokens may represent entire words or sub-words. The token sequence is formed as:

$$TOK_m = \text{Tokenizer}(u_m)$$

where $TOK_m$ is of length $T_m$ positions and consists of individual tokens $Tok_t$ at each position index t.

The method 1000, at block 1020 includes tokenizing metadata associated with the URL to form metadata tokens. The metadata tokenized may include the referrer URL, certificate data for the URL, IP address, and the like. The tokenizing of metadata can follow the same sub-word methods described with reference to block 1020. However, different vocabularies may be used for metadata tokenization. For example, an IP address or certificate data vocabulary may be built using BPE or other methods and used to identify tokens in metadata.

The method 1000, at block 1030 includes forming a token encoding from the URL tokens and the metadata tokens. The token encoding may take the form of a token vector. Each token may be associated with a position. The position of a token may indicate a semantic relationship between other tokens based on an original location in the URL or location in metadata. The token encoding can comprise a separator token between the URL tokens and the metadata tokens. Separators may be used between different types of metadata. Each separator may be different and used to indicate a type of metadata that follows. Thus, a referral URL may be associated with a first separator and a certificate authority may be associated with a second separator.

The method 1000, at block 1040 includes inputting the token encoding into a transformer model. The transformer model may be similar to model 900 described previously. A transformer is an encoder-decoder architecture. The encoder consists of a set of encoding layers that processes the input iteratively one layer after another and the decoder consists of a set of decoding layers that does the same thing to the output of the encoder. The function of each encoder layer is to process its input to generate encodings, containing information about which parts of the inputs are relevant to each other. It passes its set of encodings to the next encoder layer as inputs. Each decoder layer does the opposite, taking all the encodings and processes them, using their incorporated contextual information to generate an output sequence. To achieve this, each encoder and decoder layer makes use of an attention mechanism, which for each input, weighs the relevance of every other input and draws information from them accordingly to produce the output. Each decoder layer may also have an additional attention mechanism that draws information from the outputs of previous decoders, before the decoder layer draws information from the encodings. Both the encoder and decoder layers have a feed-forward neural network for additional processing of the outputs, and contain residual connections and layer normalization steps. The output of the transformer model may be described as an embedding vector.

As described previously, the transformer model may be trained using labeled URLs. The URLs may be labeled as phishing or not phishing.

The method 1000, at block 1050 includes, in response to inputting the token encoding into the transformer model, receiving an embedding vector from the transformer model.

The method 1000, at block 1060 includes calculating a decision statistic from the embedding vector. The decision statistic may be calculated using a machine classifier. The machine classifier may be a single-fully connected layer that generated a binary classification (e.g., phishing or not phishing) by processing the embedding vector. The classifier may be trained using labeled URLs. The URLs may be labeled as phishing or not phishing. During training, the embedding vectors output from the transformer model may be used as training data to the machine classifier. Thus, the training data for the machine classifier could be a labeled embedding vector generated by the transformer model processing a labeled URL.

The method 1000, at block 1070 includes based on the decision statistic indicating the URL is malicious, taking a remedial action that limits access to a resource associated with the URL. Example resources include a webpage, photo, video, audio file, document, service, email, and social media post. Resources can be software programs that generate content on demand Access can be limited through a warning. In one aspect, the warning is from one application (e.g., a security application) that classified the URL to a second application (e.g., web browser). The warning may be in a pop-up screen or some other user interface. The warning can include a vibration, audible sound, and/or visual indication designed to attract user attention. The warning may require the user to take additional affirmative step to access a resource through the URL. For example, the user may be warned that the URL is malicious and then asked if they are sure that they want to go to the corresponding URL. If they click yes, or provide some other affirmative instruction, then the user may be allowed to access a resource associated with the URL. In one aspect, a computing device or application is prevented from accessing resources associated with the URL. For example, a link may be disabled or a browser prevented from loading a page associated with a phishing URL. The phishing URL may be added to a browser's, device's, or other component's URL block list to prevent future access.

FIG. 11 is a flow diagram showing a method 1100 for detecting a malicious uniform resource locator (URL), in accordance with some embodiments of the present disclosure. The method 1100, at block 1110 includes tokenizing a URL to form URL tokens. As described previously, the tokenization may be sub-word tokenization. The method 1100, at block 1120 includes forming a token encoding from the URL tokens. The token encoding comprises a token and corresponding position. The token encoding is an input to a transformer.

The method 1100, at block 1130 includes inputting the token encoding into a transformer model. The method 1100, at block 1140 includes, in response to inputting the token encoding into the transformer model, receiving an embedding vector from the transformer model.

The method 1100, at block 1150 includes calculating a decision statistic from the embedding vector. The decision statistic may be calculated using a machine classifier. The method 1100, at block 1160 includes based on the decision statistic indicating the URL is malicious, taking a remedial action that limits access to a resource associated with the URL.

FIG. 12 is a flow diagram showing a method 1200 for detecting a malicious uniform resource locator (URL), in accordance with some embodiments of the present disclosure.

The method 1200, at block 1210 includes tokenizing a URL to form URL tokens. The method 1200, at block 1220 includes tokenizing metadata associated with the URL to form metadata tokens. The tokenization of the URL and metadata may be sub-word tokenization as described previously.

The method 1200, at block 1230 includes forming a token encoding from the URL tokens and the metadata tokens. The token encoding comprises a separator token between the URL tokens and the metadata tokens, as described previously.

The method 1200, at block 1240 includes inputting the token encoding into a transformer model. The method 1200, at block 1250 includes, in response to inputting the token encoding into the transformer model, receiving an embedding vector from the transformer model. The method 1200, at block 1260 includes calculating a decision statistic from the embedding vector. The decision statistic may be calculated using a machine classifier. The method 1200, at block 1270 includes, based on the decision statistic indicating the URL is malicious, taking a remedial action that limits access to content associated with the URL.

Embodiments

Embodiment 1. One or more computer storage media having computer-executable instructions embodied thereon that, when executed, by one or more processors, causes the one or more processors to perform a method for detecting a malicious uniform resource locator (URL). The method comprising tokenizing a URL into URL tokens. The method also comprising tokenizing metadata associated with the URL into metadata tokens. The method also comprising forming a token encoding from the URL tokens and the metadata tokens. The method also comprising inputting the token encoding into a transformer model. The method also comprising, in response to inputting the token encoding into the transformer model, receiving an embedding vector from the transformer model. The method also comprising calculating a decision statistic from the embedding vector. The method also comprising based on the decision statistic indicating the URL is malicious, taking a remedial action that limits access to content associated with the URL.

The technology described in embodiment 1 uses transformer models on the phishing URL detection task. The use of transformers significantly improves the performance of phishing URL detection over a wide range of very low false positive rates (FPRs) compared to other deep learning-based methods. The joint token encoding of the URL and metadata tokens allows a single transformer model to consider context and URL text together.

Embodiment 2. The media of embodiment 1, wherein forming the token encoding comprises using a Byte Pair Encoding (BPE) model. The BPE model ensures that the most common words in a URL will be represented in the new vocabulary as a single token, while less common words will be broken down into two or more sub-word tokens. The BPE method appears to be an effective way to form a token encoding when compared to other token encoding methods.

Embodiment 3. The media of embodiment 2, the BPE model uses a URL specific vocabulary. Using a URL specific vocabulary may lead to improved performance when compared to a generic vocabulary generated from analysis of edited text.

Embodiment 4. The media as in any one of the preceding embodiments 1, wherein forming the token encoding comprises using a word piece model. Using a word piece model can provide morphological insights to improve inference that may not be provided by other models, such as full-length word models.

Embodiment 5. The media as in any one of the preceding embodiments 1, wherein the remedial action comprises preventing a computing device from accessing the URL.

Embodiment 6. The media as in any one of the preceding 1, wherein the method further comprises adding compound word split URLs to a training data corpus, the compound word split URLs labeled as phishing URLs.

Embodiment 7. The media as in any one of the preceding 1, wherein the token encoding comprises a separator token between the URL tokens and the metadata tokens.

Embodiment 8. A method for detecting a malicious uniform resource locator (URL). The method comprising tokenizing a URL into URL tokens. The method also comprising forming a token encoding from the URL tokens. The method also comprising inputting the token encoding into a transformer model. The method also comprising, in response to inputting the token encoding into the transformer model, receiving an embedding vector from the transformer model. The method also comprising calculating a decision statistic from the embedding vector. The method also comprising, based on the decision statistic indicating the URL is malicious, taking a remedial action that limits access to content associated with the URL.

The technology described in embodiment 8 uses transformer models on the phishing URL detection task. The use of transformers significantly improves the performance of phishing URL detection over a wide range of very low false positive rates (FPRs) compared to other deep learning-based methods.

Embodiment 9. The method of embodiment 8, wherein forming the token encoding comprises using a Byte Pair Encoding (BPE) model. The BPE model ensures that the most common words in a URL will be represented in the new vocabulary as a single token, while less common words will be broken down into two or more sub-word tokens. The BPE method appears to be an effective way to form a token encoding when compared to other token encoding methods.

Embodiment 10. The method as in any one of embodiments 8 and 9, wherein forming the token encoding comprises using a word piece model. Using a word piece model can provide morphological insights to improve inference that may not be provided by other models, such as full-length word models.

Embodiment 11. The method as in any one of embodiments 8, 9 and 10, wherein the token encoding comprises token positions and corresponding tokens.

Embodiment 12. The method as in any one of embodiments 8, 9, 10 and 11, further comprising adding compound word split URLs to a training data corpus, the compound word split URLs labeled as phishing URLs. Embodiment 12 produces training data that can supplement actual URLs identified as phishing URLs with simulated phishing URLs. Phishing URLs are underrepresented in the training data. Generating simulated phishing URLs can provide additional training data, which may facilitate a better-trained transformer model.

Embodiment 13. The method as in any one of embodiments 8, 9, 10, 11 and 12, wherein the transformer model is a bidirectional encoder representation trained with URL training data.

Embodiment 14. The method as in any one of embodiments 8, 9, 10, 11, 12 and 13, wherein the transformer model is a bidirectional encoder representation trained on a natural language vocabulary and optimized with URL training data.

Embodiment 15. The method as in any one of embodiments 8, 9, 10, 11, 12, 13 and 14, comprising preventing a computing device from accessing the URL.

Embodiment 16. A system comprising one or more hardware processors and one or more computer-readable media having executable instructions embodied thereon, which, when executed by the one or more processors, cause the one or more hardware processors to execute actions comprising tokenizing a URL into URL tokens. The actions also comprising tokenizing metadata associated with the URL into metadata tokens. The actions also comprising forming a token encoding from the URL tokens and the metadata tokens, the token encoding comprising a separator token between the URL tokens and the metadata tokens. The actions also comprising inputting the token encoding into a transformer model. The actions also comprising, in response to inputting the token encoding into the transformer model, receiving an embedding vector from the transformer model. The actions also comprising calculating a decision statistic from the embedding vector. The actions also comprising, based on the decision statistic indicating the URL is malicious, taking a remedial action that limits access to content associated with the URL.

The technology described in embodiment 16 uses transformer models on the phishing URL detection task. The use of transformers significantly improves the performance of phishing URL detection over a wide range of very low false positive rates (FPRs) compared to other deep learning-based methods. The joint token encoding of the URL and metadata tokens allows a single transformer model to consider context and URL text together.

Embodiment 17. The system of embodiment 16, wherein forming the token encoding comprises using a Byte Pair Encoding (BPE) model that uses a URL specific vocabulary. The BPE model ensures that the most common words in a URL will be represented in the new vocabulary as a single token, while less common words will be broken down into two or more sub-word tokens. The BPE method appears to be an effective way to form a token encoding when compared to other token encoding methods.

Embodiment 18. The system as in any one of embodiments 16 and 17, wherein the transformer model is a bidirectional encoder representation trained with URL training data.

Embodiment 19. The system as in any one of embodiments 16, 17 and 18, wherein the machine classifier is a single fully connected layer.

Embodiment 20. The system as in any one of embodiments 16, 17, 18 and 19, wherein the metadata is certificate authority for the URL.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. One or more computer storage media having computer-executable instructions embodied thereon that, when executed, by one or more processors, causes the one or more processors to perform a method for detecting a malicious uniform resource locator (URL) the method comprising:
   tokenizing a URL into URL tokens;
   tokenizing metadata associated with the URL into metadata tokens;
   forming a token encoding from the URL tokens and the metadata tokens by generating a joint Byte Pair Encoding (BPE) that combines the URL tokens and the metadata tokens;
   inputting the token encoding into a transformer model;
   in response to inputting the token encoding into the transformer model, receiving an embedding vector from the transformer model;
   calculating a decision statistic from the embedding vector; and
   based on the decision statistic indicating the URL is malicious, taking a remedial action that limits access to a resource associated with the URL.

2. The media of claim 1, the BPE model uses a URL specific vocabulary.

3. The media of claim 1, wherein forming the token encoding comprises using a word piece model.

4. The media of claim 1, wherein the remedial action comprises preventing a computing device from accessing the URL.

5. The media of claim 1, wherein the method further comprises adding compound word split URLs to a training data corpus, the compound word split URLs labeled as phishing URLs.

6. The media of claim 1, wherein the token encoding comprises a separator token between the URL tokens and the metadata tokens.

7. A method for detecting a malicious uniform resource locator (URL) the method comprising:
   tokenizing a URL into URL tokens;
   forming a token encoding from the URL tokens by using a Byte Pair Encoding (BPE) model;
   inputting the token encoding into a transformer model;

in response to inputting the token encoding into the transformer model, receiving an embedding vector from the transformer model;
calculating a decision statistic from the embedding vector; and
based on the decision statistic indicating the URL is malicious, taking a remedial action that limits access to a resource associated with the URL.

8. The method of claim 7, wherein forming the token encoding comprises using a word piece model.

9. The method of claim 7, wherein the token encoding comprises token positions and corresponding tokens.

10. The method of claim 7, further comprising adding compound word split URLs to a training data corpus, the compound word split URLs labeled as phishing URLs.

11. The method of claim 7, wherein the transformer model is a bidirectional encoder representation trained with URL training data.

12. The method of claim 7, wherein the transformer model is a bidirectional encoder representation trained on a natural language vocabulary and optimized with URL training data.

13. The method of claim 7, comprising preventing a computing device from accessing the URL.

14. A system comprising:
one or more hardware processors; and
one or more computer-readable media having executable instructions embodied thereon, which, when executed by the one or more processors, cause the one or more hardware processors to execute actions comprising:
tokenizing a uniform resource locator (URL) into URL tokens;
tokenizing metadata associated with the URL into metadata tokens;
forming a token encoding from the URL tokens and the metadata tokens by generating a Byte Pair Encoding (BPE) that uses a URL specific vocabulary, the token encoding comprising a separator token between the URL tokens and the metadata tokens;
inputting the token encoding into a transformer model;
in response to inputting the token encoding into the transformer model, receiving an embedding vector from the transformer model;
calculating a decision statistic from the embedding vector; and
based on the decision statistic indicating the URL is malicious, taking a remedial action that limits access to a resource associated with the URL.

15. The system of claim 14, wherein the transformer model is a bidirectional encoder representation trained with URL training data.

16. The system of claim 14, wherein the decision statistic is calculated with a machine classifier comprising a single fully connected layer.

17. The system of claim 14, wherein the metadata is certificate authority for the URL.

18. The media of claim 1, wherein the method further comprises causing the transformer model to perform a mask pretraining task to determine a correlation between features associated with the URL and features associated with the metadata.

19. The media of claim 1, wherein the token encoding includes word tokens corresponding to the URL tokens and position information associated with the URL tokens in the URL.

20. The system of claim 14, wherein the token encoding includes URL tokens and the metadata tokens and position information associated with the URL tokens in the URL.

\* \* \* \* \*